US012760836B2

(12) United States Patent
Goh

(10) Patent No.: US 12,760,836 B2
(45) Date of Patent: Oct. 13, 2026

(54) INFORMATION HANDLING SYSTEM CAMERA MULTI-AXIS DISPLAY BRACKET

(71) Applicant: Dell Products L.P., Round Rock, TX (US)

(72) Inventor: Peng Lip Goh, Singapore (SG)

(73) Assignee: Dell Products L.P., Round Rock, TX (US)

( * ) Notice: Subject to any disclaimer, the term of this patent is extended or adjusted under 35 U.S.C. 154(b) by 130 days.

(21) Appl. No.: 18/980,352

(22) Filed: Dec. 13, 2024

(65) Prior Publication Data

US 2026/0169360 A1 Jun. 18, 2026

(51) Int. Cl.
*F16M 13/02* (2006.01)
*G03B 17/56* (2021.01)

(52) U.S. Cl.
CPC ......... *F16M 13/022* (2013.01); *G03B 17/561* (2013.01)

(58) Field of Classification Search
CPC .... G03B 17/561; G06F 1/1607; F16M 13/022
See application file for complete search history.

(56) References Cited

U.S. PATENT DOCUMENTS 7,567,287 B2 7/2009 Hyatt
9,367,220 B2 6/2016 Izaki
10,147,529 B2 12/2018 Nishino et al.
10,338,341 B2 7/2019 Osaka et al.
11,226,466 B2 1/2022 Wang et al.
11,586,155 B2 2/2023 Ok et al.
11,789,490 B2 * 10/2023 Li ......................... G06F 1/1605 248/316.7
12,153,333 B2 * 11/2024 Liu ...................... G03B 17/561
2007/0189763 A1 8/2007 Kojima et al.
2015/0022705 A1 1/2015 Wang et al.
2022/0377220 A1 11/2022 Suzuki

FOREIGN PATENT DOCUMENTS

KR 101683447 B1 * 12/2016 ............. H04N 5/225

* cited by examiner

*Primary Examiner* — Leon W Rhodes, Jr.
(74) *Attorney, Agent, or Firm* — ZAGORIN CAVE LLP; Robert W. Holland

(57) ABSTRACT

An information handling system camera couples in a cylinder that rotates in a frame between an operational position that exposes the camera lens and a non-operational position that blocks the camera lens. Rotation is automated by an electromagnet coupled to a frame that holds the cylinder and a magnet coupled in the cylinder. Rotation is commanded by an input at an input dial at one end of the cylinder or detection of a hand blocking the lens. The camera couples to a bracket fully rotational with selective release of rotational axes to fit at any side of a display with the camera oriented towards the display viewing area.

20 Claims, 23 Drawing Sheets

INFORMATION HANDLING SYSTEM CAMERA MULTI-AXIS DISPLAY BRACKET

BACKGROUND OF THE INVENTION

Field of the Invention

The present invention relates in general to the field of information handling systems, and more particularly to an information handling system multi-axis display bracket.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems process information with processing components assembled in a housing. Stationary information handling systems, such as desktops and towers, process information in a fixed position housing and interact with the processor and memory through peripheral input devices, such as a peripheral keyboard and mouse. Portable information handling systems integrate processing components, a display and a power source in a portable housing to support mobile operations. Portable information handling systems allow end users to carry a system between meetings, during travel, and between home and office locations so that an end user has access to processing capabilities while mobile. Portable information handling systems also support end user interactions through peripheral devices, such as through a docking station. End users tend to prefer presenting visual images at a peripheral display when possible, instead of an integrated display, since the peripheral display generally offers a larger viewing area.

One common function of information handling systems is to act as a communication tool that supports videoconferencing. Portable information handling systems often include cameras in the portable housing to support videoconferencing when on the go, however, integrated cameras tend to have a limited capability driven by the minimal thickness of the portable housing. In contrast, peripheral cameras that couple to a display perimeter or a camera stand offer improved camera resolution with a larger camera housing that supports larger lens assemblies. Peripheral cameras capture visual images that are communicated to the information handling system, such as through WIFI or a USB cable, and then used by a video conferencing application to communicate through a network with videoconference participants.

One difficulty with the use of cameras in an information handling system environment is that a malicious actor can gain control of the camera to spy on an end user. To determine if a camera is in operation, end users typically have to rely on subtle visual confirmation provided by a privacy shutter and/or light indicators. In some instances, privacy shutters fail to fully close and indicator lights fail to illuminate. Given the subtlety of the operational indications, end users may simply fail to notice that a camera is operating, especially when the camera is at a distance or when lighting conditions are low. An end user can receive some help from security software that shuts down the camera and blocks image capture with automated shutters, however, the actuators for automated shutters tend to occupy a good deal of space.

Another difficulty that arises with the placement of a peripheral camera in position to capture visual images. Typically, end users want the camera to be in a location near where the end user will view a videoconference so that the end user is looking into the camera when viewing the videoconference. In desktop setups that include multiple monitors, the end user will have trouble placing the camera near a centrally-viewed location. Secure attachment to the display is needed to avoid having the camera fall and little room exists between adjacent displays where the end user can manipulate the camera stand. The risk of the camera falling out of place or moving increases when an end user has to interact with buttons on the camera to control the camera operation.

SUMMARY OF THE INVENTION

Therefore, a need has arisen for a system and method which provides visual confirmation of a camera operational state.

A further need exists for a system and method that automatically actuates a camera between operational and nonoperational states.

A further need exists for a system and method that couples a camera to a display in a restricted available space.

A further need exists of input buttons on the camera that actuate without excessive force.

In accordance with the present invention, a system and method are provided which substantially reduce the disadvantages and problems associated with previous methods and systems. A camera module coupled in a cylinder rotates between an operational position that exposes the camera lens and a nonoperational position that blocks the camera lens.

More specifically, an information handling system processes information with a processor that executes instructions and a memory that stores the instructions and information, such as an operating system and videoconference application. A camera couples to a display that presents the information as visual images, such as with a camera bracket. The camera has a camera module coupled in a cylinder that rotates between an operational position that exposes the camera module and a nonoperational position that blocks the camera module. The cylinder initiates rotation in response to activation of an electromagnet that aligns with like poles of magnets coupled to the cylinder and completes rotation by reversing the electromagnet current. An input dial on the side of the cylinder accepts button presses and dial rotation to command transitions between the operational and nonoperational states. A bracket couples the camera to the display with a multi axis rotation to select a variety of camera positions that capture visual images of a viewing area of the display.

The present invention provides a number of important technical advantages. One example of an important technical advantage is that a camera appearance readily shows operational and nonoperational states by rotating the camera lens to an open face and to a blocked position. Rotation is performed with an electromagnet included in the camera cylinder that manages rotation with current applied by a processing resource. An input dial on the side of the cylinder has soft touch and rotation inputs that impart the input commands with minimal force so that the camera is not disturbed at its position on a bracket. The bracket configures to rotate about multiple axes so that the camera can capture a viewing position at a display to which the bracket attaches by rotating the camera at the multiple axes.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system peripheral camera rotates between operational and nonoperational states. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
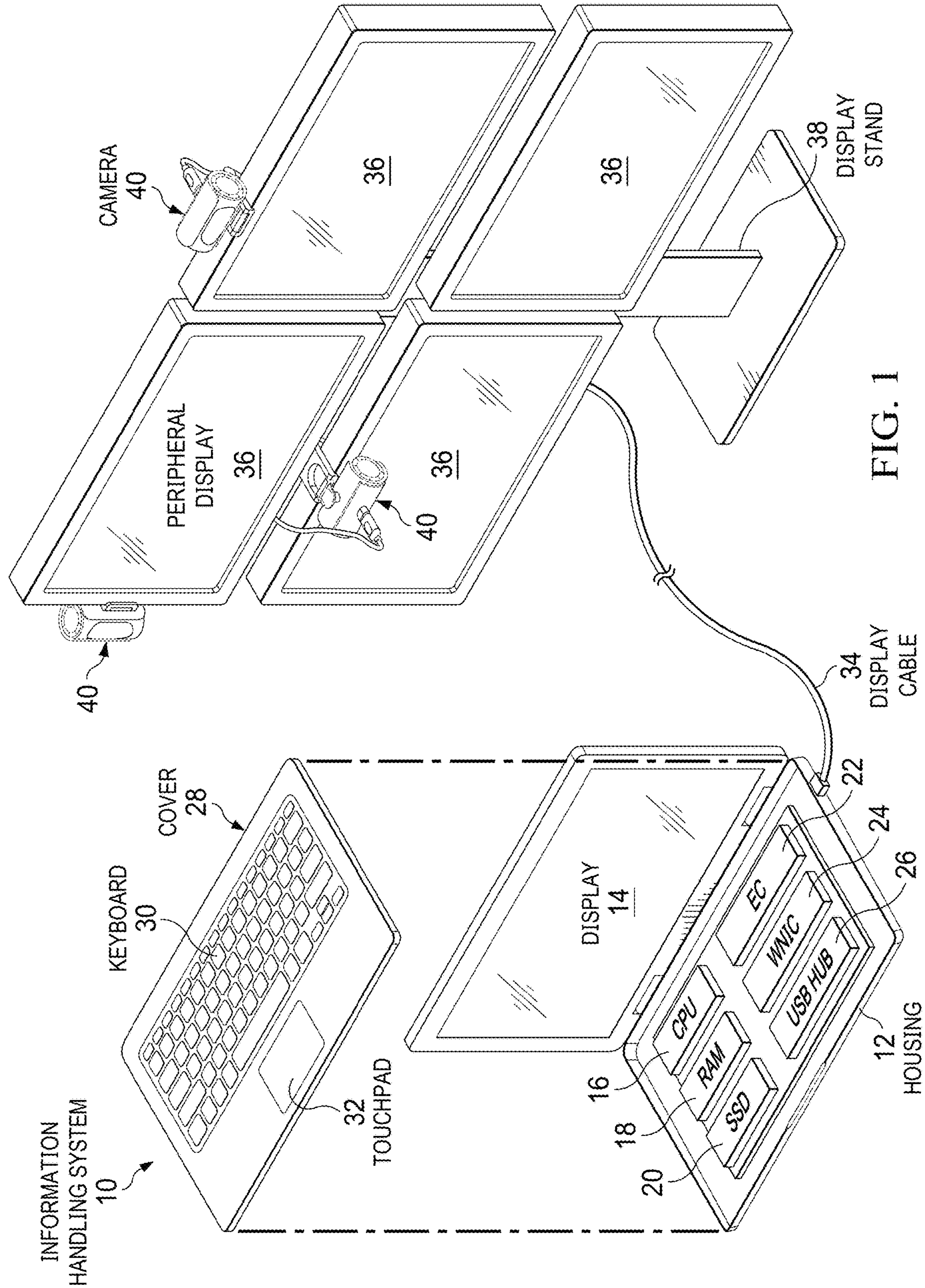
FIG. 1 depicts an upper perspective exploded view of an example embodiment of an information handling system having a camera coupled in plural positions at a display to capture visual images of an end user viewing the display.

Referring now to FIG. 1, an upper perspective exploded view depicts an example embodiment of an information handling system 10 having a camera 40 coupled in plural positions at a display 36 to capture visual images of an end user viewing the display. In the example embodiment, information handling system 10 has a portable housing 12 that contains processing components and integrates a display 14 to present information as visual images. A central processing unit (CPU) 16 executes instructions to process information in cooperation with a random access memory (RAM) 18 that stores the instructions and information. A solid state drive (SSD) 20 provides persistent storage that stores the instructions and information during power down of the system, such as an operating system and applications that are retrieved by an embedded controller 22 to execute on CPU 16. Embedded controller 22 also manages operating conditions within housing 12 and interactions with input devices. A wireless network interface controller (WNIC) 24 supports communication with external devices, such as with Ethernet, WIFI and BLUETOOTH. A USB hub 26 supports communication with external devices through USB cables. A housing cover 28 couples over the processing components and supports a keyboard 30 and touchpad 32 that accept end user inputs.

In the example embodiment, a display cable 34 interfaces information handling system 10 with plural peripheral displays 36 that mount on a display stand 38. For example, peripheral displays 36 daisy chain to present visual images in a rectangular formation. A camera 40 couples to peripheral displays 36 with a bracket that adjusts the position of the peripheral camera to adapt to different positions at the displays. One camera 40 couples to a very top position of the peripheral display assembly, however, this position captures images of an end user with a down angle that might look unusual in a video conference. Another camera 40 couples to a side of a peripheral display, however, this position captures images of an end user with a side angle that might look unusual in a video conference. Another camera 40 couples in the middle of the peripheral display assembly to offer a more central location with a more natural angle relative to an end user viewing the displays. As is described in greater detail below, a rotating architecture of the camera provides a clear indication to an end user of whether the camera is in an operational or nonoperational state. The camera bracket adjusts at multiple axes to quickly adapt to different positions on the peripheral display.

Figure 2A:
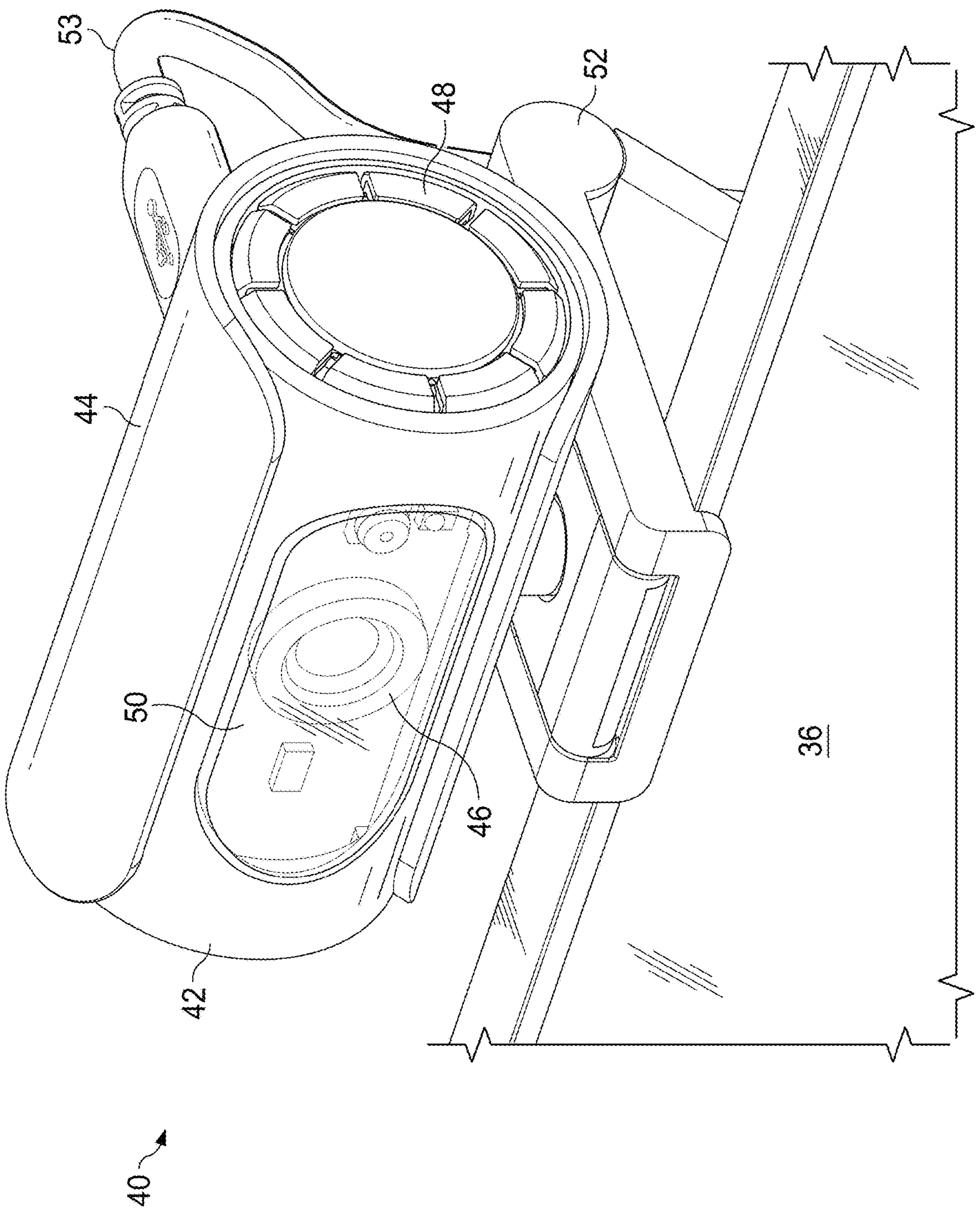
FIGS. 2A and 2B depict a side perspective view of an example embodiment of a camera having a rotational architecture to define operational and nonoperational states.
Figure 2B:
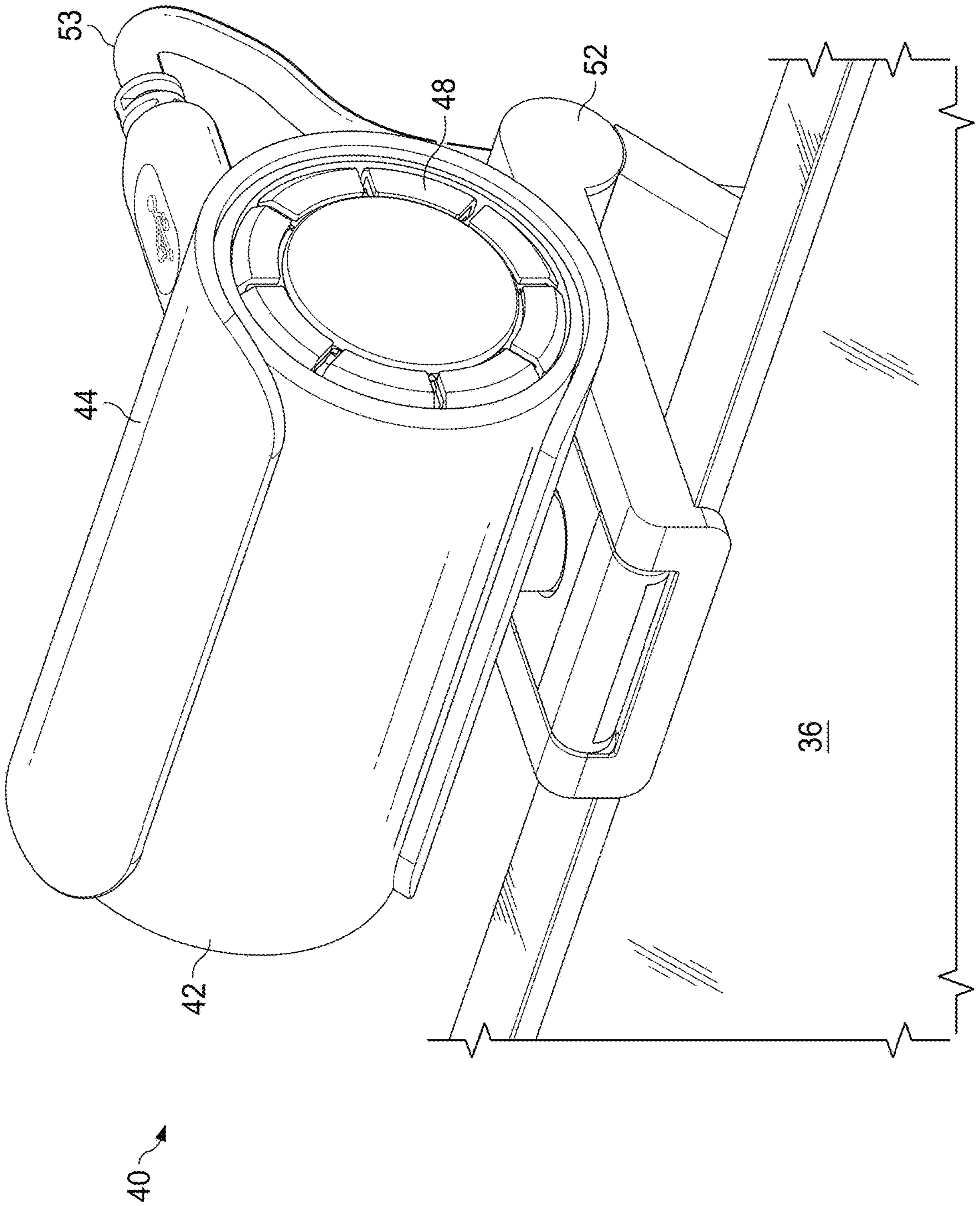

Referring now to FIGS. 2A and 2B, a side perspective view depicts an example embodiment of a camera 40 having a rotational architecture to define operational and nonoperational states. Camera 40 is depicted in FIG. 2A in an operational state having a camera module 46 capturing visual images through a front glass 50 that fills an opening of a cylinder 42 that contains camera module 46. Cylinder 42 couples in an outer frame 44 that has a cylindrical shape and an open face through which the camera can capture visual images. Camera 40 couples to peripheral display 36 with a bracket 52 and interfaces with an information handling system through a USB or similar cable 53. An input dial 48 with multiple input buttons accepts inputs to control camera 40, such as a rotation or a button press to command rotation of cylinder 42 from the operational position of FIG. 2A to a nonoperational position of FIG. 2B. Upon a command to convert to a nonoperational position, cylinder 42 rotates in the direction of the arrow within the cylindrical shape of outer frame 44 so that the camera module is rotated out of alignment with the open face of outer frame 44 and blocked by the structure of outer frame 44. An end user can quickly determine the state of camera 40 by recognizing that the camera module is blocked from capturing visual images.

Figure 3A:
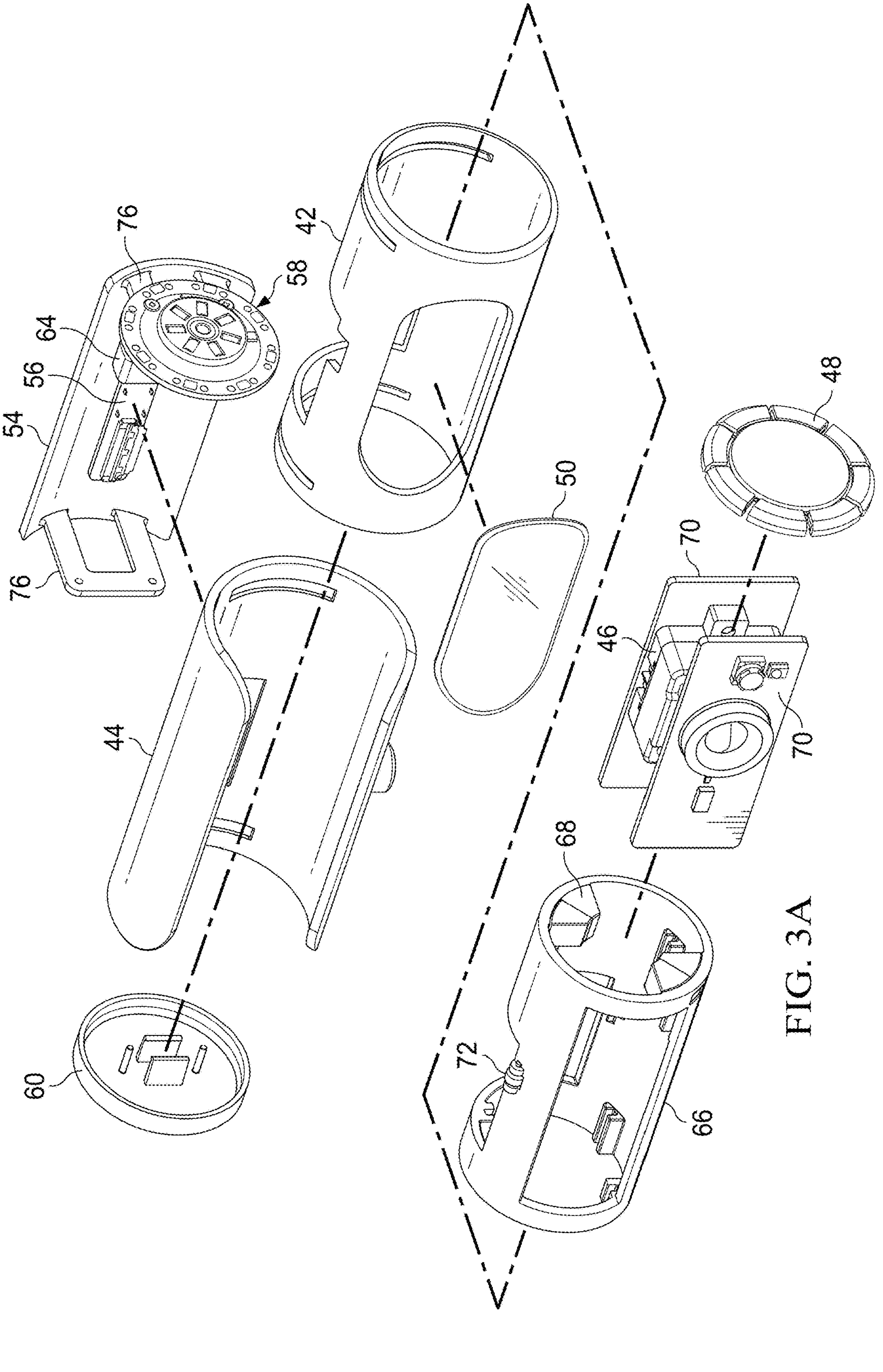
FIGS. 3A and 3B depict front and rear exploded perspective views of an example embodiment of the camera rotational architecture.
Figure 3B:
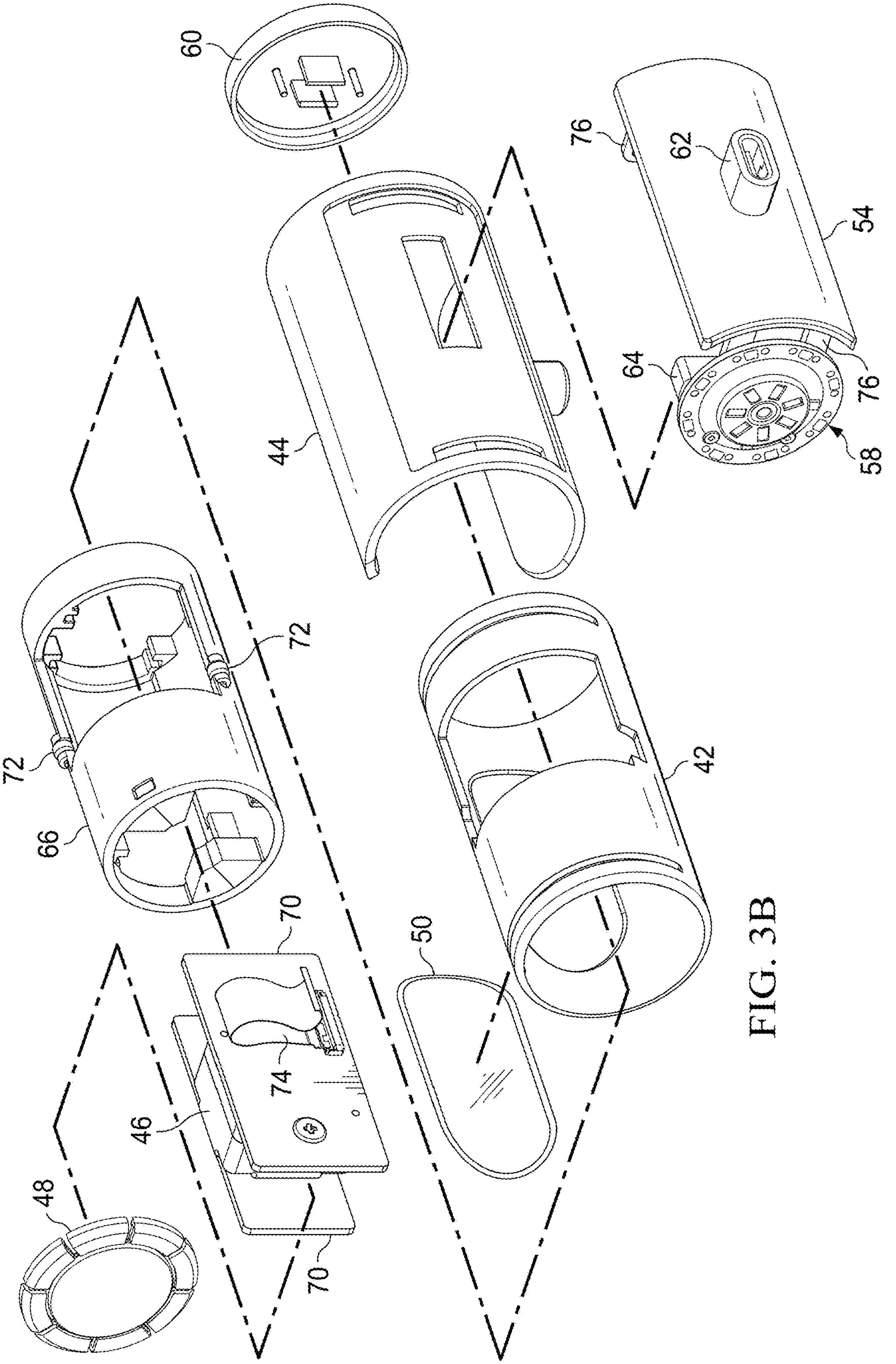

Referring now to FIGS. 3A and 3B, front and rear exploded perspective views depict an example embodiment of the camera rotational architecture. Camera module 46 is captured between a pair of printed circuit boards 70 that couple into the interior of an inner frame 66 with the camera module lens aligned to direct out a front opening of inner frame 66. Inner frame 66 includes magnets 68 coupled at one end on the circumference of the cylinder shape of inner frame 66 at opposite sides. Rollers 72 couple to the outer surface of inner frame 66 and extend out slightly to aid in rotation of the camera as described below. Inner frame 66 inserts into cylinder 42 with camera module 46 aligned to capture visual images through a front opening of cylinder 42. A glass piece 50 couples in the opening of cylinder 42 to protect the camera module in the cylinder interior. Rollers 72 extend out past the outer circumference of cylinder 42 to engage against an outer frame 44. Cylinder 42 rotates within outer frame 44 with rollers 72 reducing friction of the cylinder by spacing the cylinder slightly from outer frame 44 and rolling about a bearing. An end cap 60 couples over one end of cylinder 42 to enclose the cylinder interior.

The amount of rotation of cylinder 42 relative to outer frame 44 is managed by arms 76 that extend from a rear support 54 through slots formed in the outer frame 44 and cylinder 42. Rear support 54 has a cylindrical C-shape that conforms to outer frame 44 and printed circuit board 56 that extends through an opening of outer frame 44 and has a processing resource and non-transitory flash memory with instructions that execute on the processing resource to manage camera operations. A Type C USB port receptacle 62 couples to printed circuit board 56 and extends out from the rear side of rear support 54. A flexible cable 74 at the rear side of circuit boards 70 holding camera module 46 interfaces with printed circuit board 56 and flexes during rotation of cylinder 42 to maintain an interface between printed circuit board 56 and camera module 46. Side dial 48 couples to a dial printed circuit board 58 at the end of cylinder 42 opposite end cap 60. An electromagnet 64 couples to dial printed circuit board 58 and upper and lower arms 76 of rear support 54 to maintain a stationary orientation relative to rear support 54 and outer frame 44. When a selection is made to convert between operational and nonoperational states, electromagnet 64 is activated with a current to generate a magnetic field that interacts with magnets 68 to rotate cylinder 42 relative outer frame 44 and rear support 54. Rollers 72 coupled to inner frame 66 include ball bearings that reduce friction for rotation to enable rotation in response to the interaction of the magnetic fields.

Figure 4A:
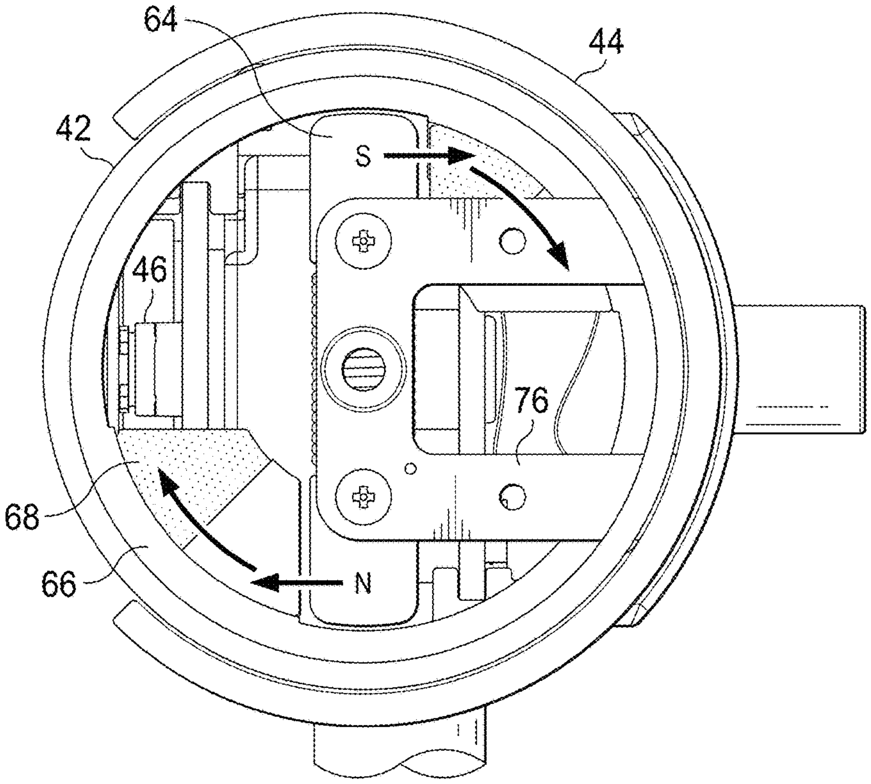
FIGS. 4A, 4B and 4C depict side sectional views of rotation of the camera from an operational position to a nonoperational position.
Figure 4B:
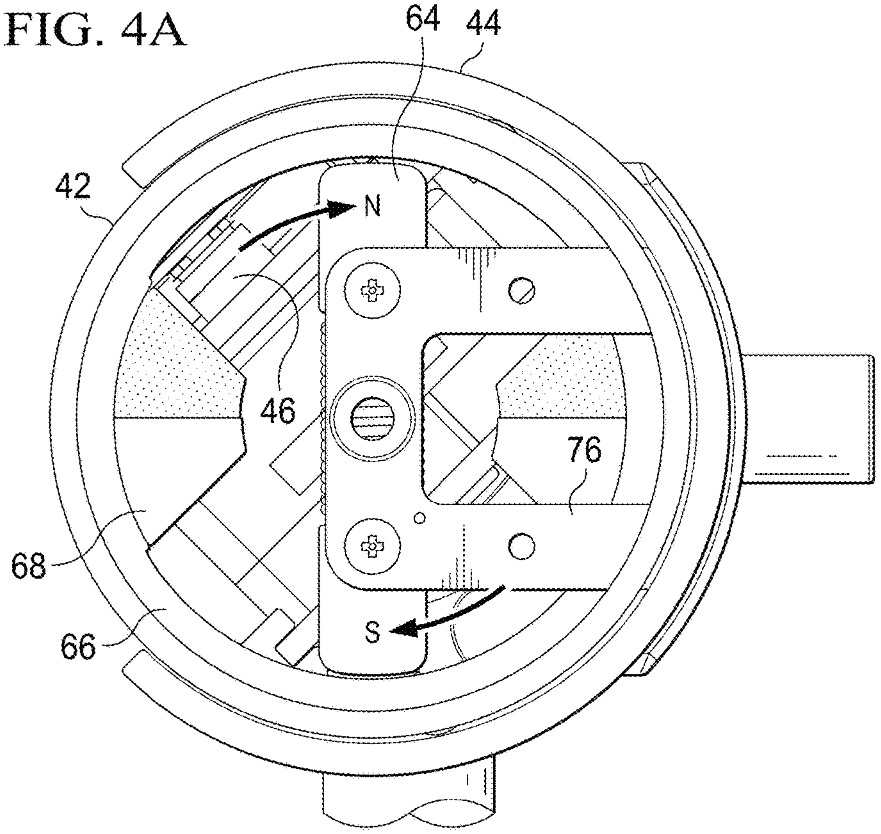
Figure 4C:
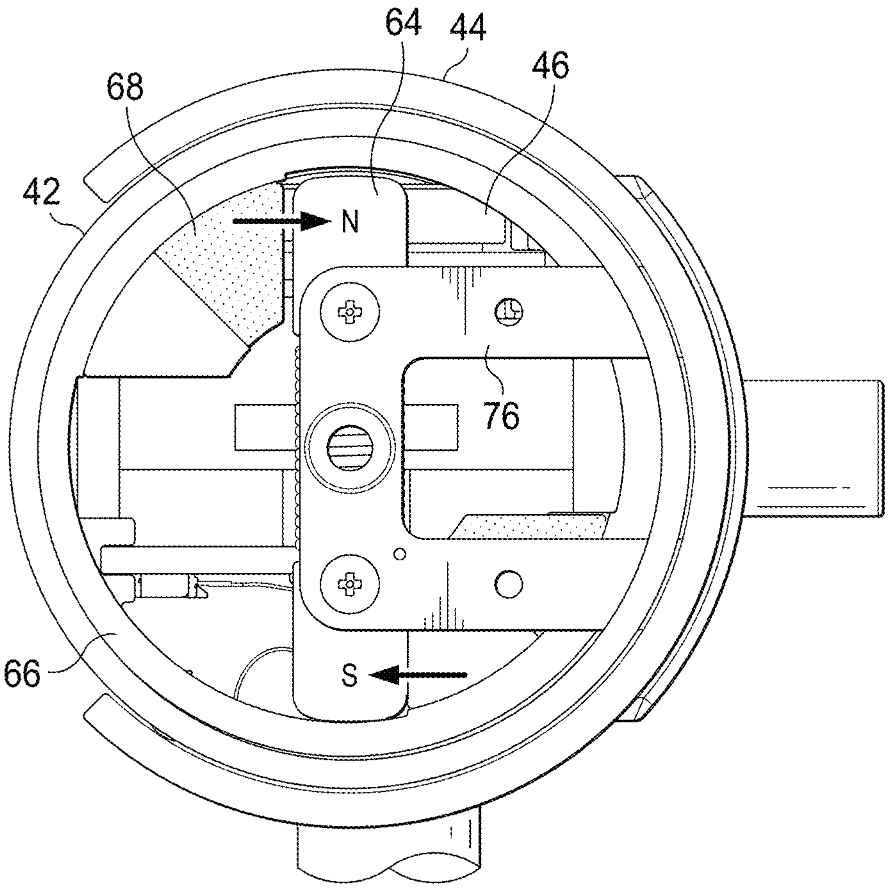

Referring now to FIGS. 4A, 4B and 4C, side sectional views depict rotation of the camera from an operational position to a nonoperational position. FIG. 4A depicts camera module 46 aligned with the front opening of cylinder body 42 and the open face of outer frame 44 to capture visual images. A set of magnets 68 couple to inner frame 66 at opposing sides so that a north pole is proximate electromagnet 64 at a bottom side and a south pole is proximate electromagnet 64 at a top side. When no current is applied to electromagnet 64, magnets 68 attract to the underlying ferromagnetic material of the electromagnet to hold cylinder 42 in the operational position. When a command or condition is detected to transition to the nonoperational state, a current is applied to the coil of electromagnet 64 to match the polarity at each end of the electromagnet with the polarity of magnets 68 so that a repelling magnetic force is generated. In the example embodiment, electromagnet 64 is screwed to upper and lower arms 76 extending from rear support 54 to hold a constant position while magnets 68 rotate with cylinder 42. Current to generate the magnetic field is provided by a processing resource, such as a microcontroller unit (MCU) coupled to the printed circuit board of rear support 54 or the dial printed circuit board.

In the example embodiment, a north polarity at the bottom end of electromagnet 64 repels a north polarity of bottom magnet 68, and a south polarity of the upper end of electromagnet 64 repels the south pole of the upper magnet 68. The like polarities initiate rotation of cylinder 42 from the operational position towards the nonoperational position as depicted by FIG. 4B. As the rotation approaches a halfway point, current to the electromagnet is turned off so that momentum of the cylinder and magnets continue the rotation. Current at the electromagnet is then reversed so that the upper end of the electromagnet has a north polarity that attracts the south polarity of the magnet 68 traveling upwards and the lower end of the electromagnet has a south polarity that attracts the north polarity of the magnet traveling downwards. Magnetic attraction then completes the rotation of the cylinder to the nonoperational position as depicted by FIG. 4C. The electromagnet is then switched off so that the permanent magnets 68 attract to the underlying ferromagnetic material. Rotation from the nonoperational position back to the operational position is performed with the same steps.

Figure 5A:
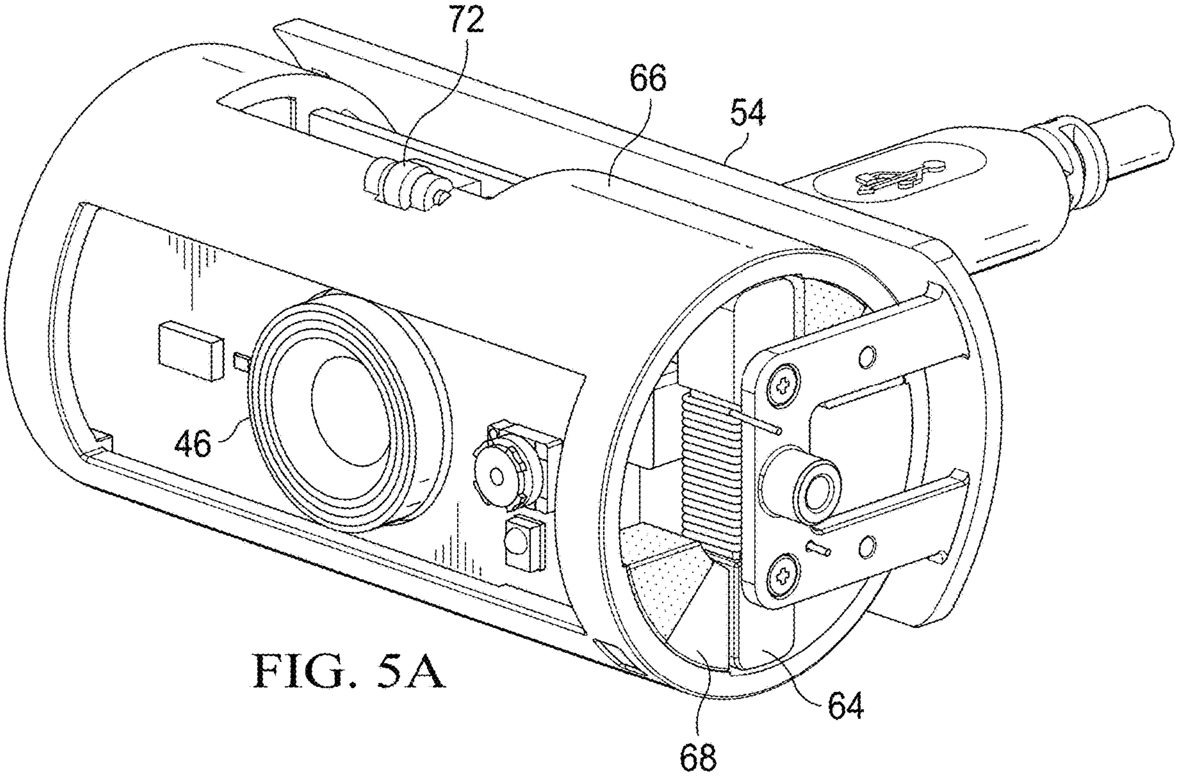
FIGS. 5A and 5B depict upper perspective transparent views of the camera in an operational and nonoperational position.
Figure 5B:
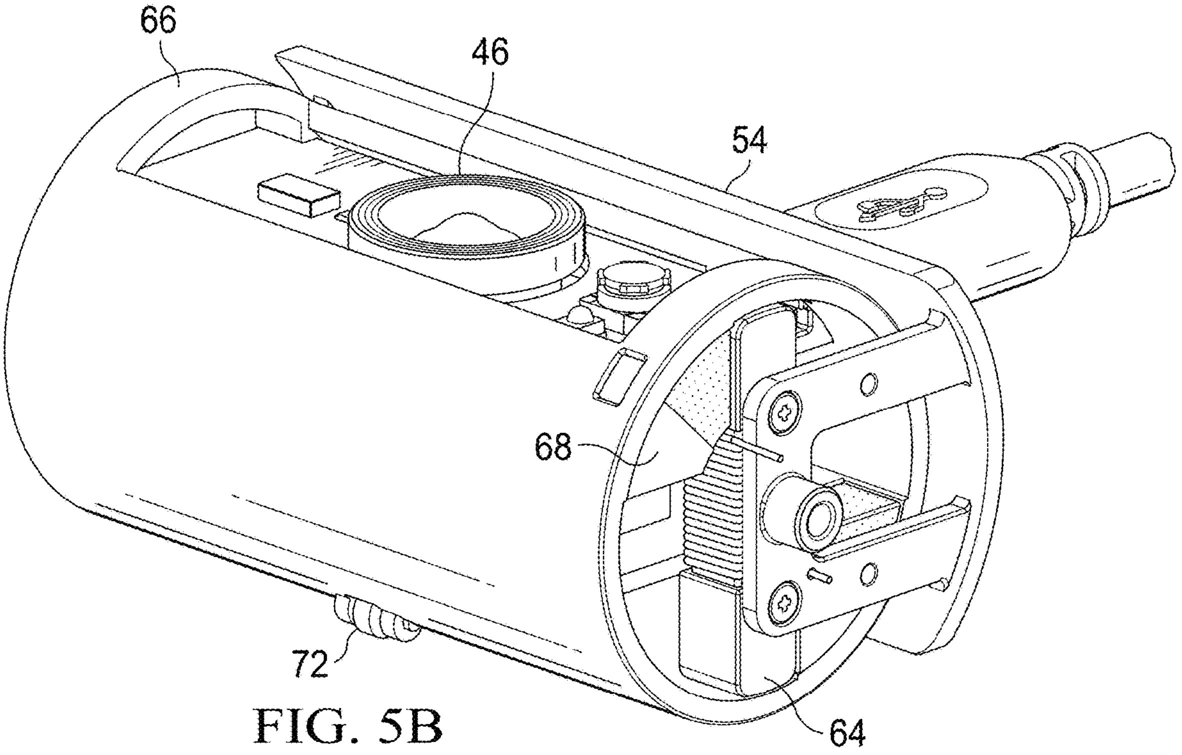

Referring now to FIGS. 5A and 5B, an upper perspective transparent view depicts the camera in an operational and nonoperational position. FIG. 5A depicts camera module 46 rotated in the inner frame to direct out a front position. The cylinder portion and outer frame of the housing is removed to show the roller 72 that interacts with the outer frame to smooth rotation of the cylinder relative to the outer frame. Magnets 68 attract to electromagnet 64 to maintain the operational position. Arms extending from rear support 54 into the interior of the cylinder provide a stable platform to couple the electromagnet in place. FIG. 5B depicts the camera with camera module 46 rotated 90 degrees where the cylinder opening aligns with outer frame to block capture of visual images by the camera.

Figure 6:
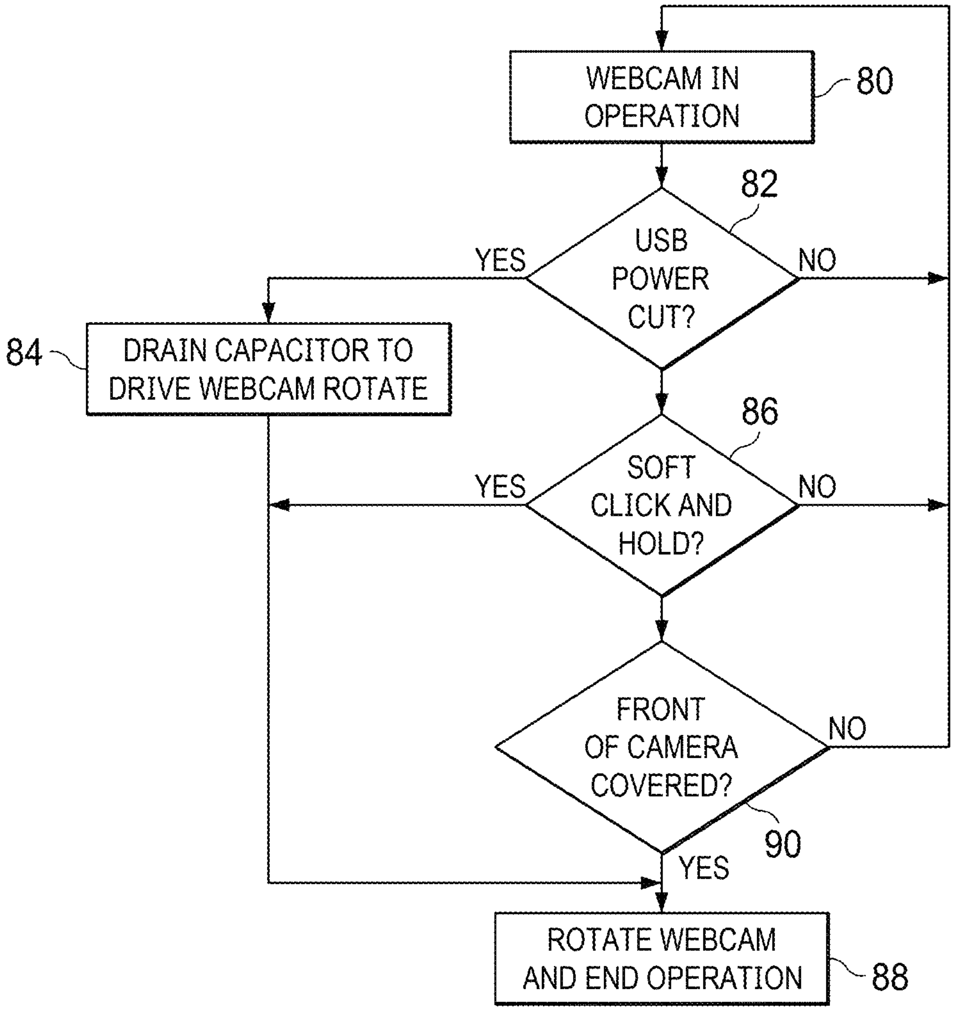
FIG. 6 depicts a flow diagram of a process for managing a camera operational state.

Referring now to FIG. 6, a flow diagram depicts a process for managing a camera operational state. The process starts at step 80 with the camera in an operational state having the camera rotated to capture visual images. At step 82 a determination is made of whether the camera has USB power removed, such as by unplugging the USB cable from the housing rear support. If USB power is cutoff, the process continues to step 84 to drain the capacitor and drive the camera to rotate to the nonoperational state. If power remains on, the process continues to step 86 to determine if a soft clip is detected at the dial input device. If an input button press is detected, the process continues to step 88 to rotate the camera to the nonoperational state and power down the camera module. If a soft click input is not detected, the process continues to step 90 to determine if a hand is held in front of the camera lens for a predetermined time. If a hand blocks the camera lens, the process continues to step 88 to rotate the camera to the nonoperational position and power off the camera module. If at step 90 the camera operation is not commanded off or powered down, the process returns to step 80 to continue monitoring the operational condition.

Figure 7:
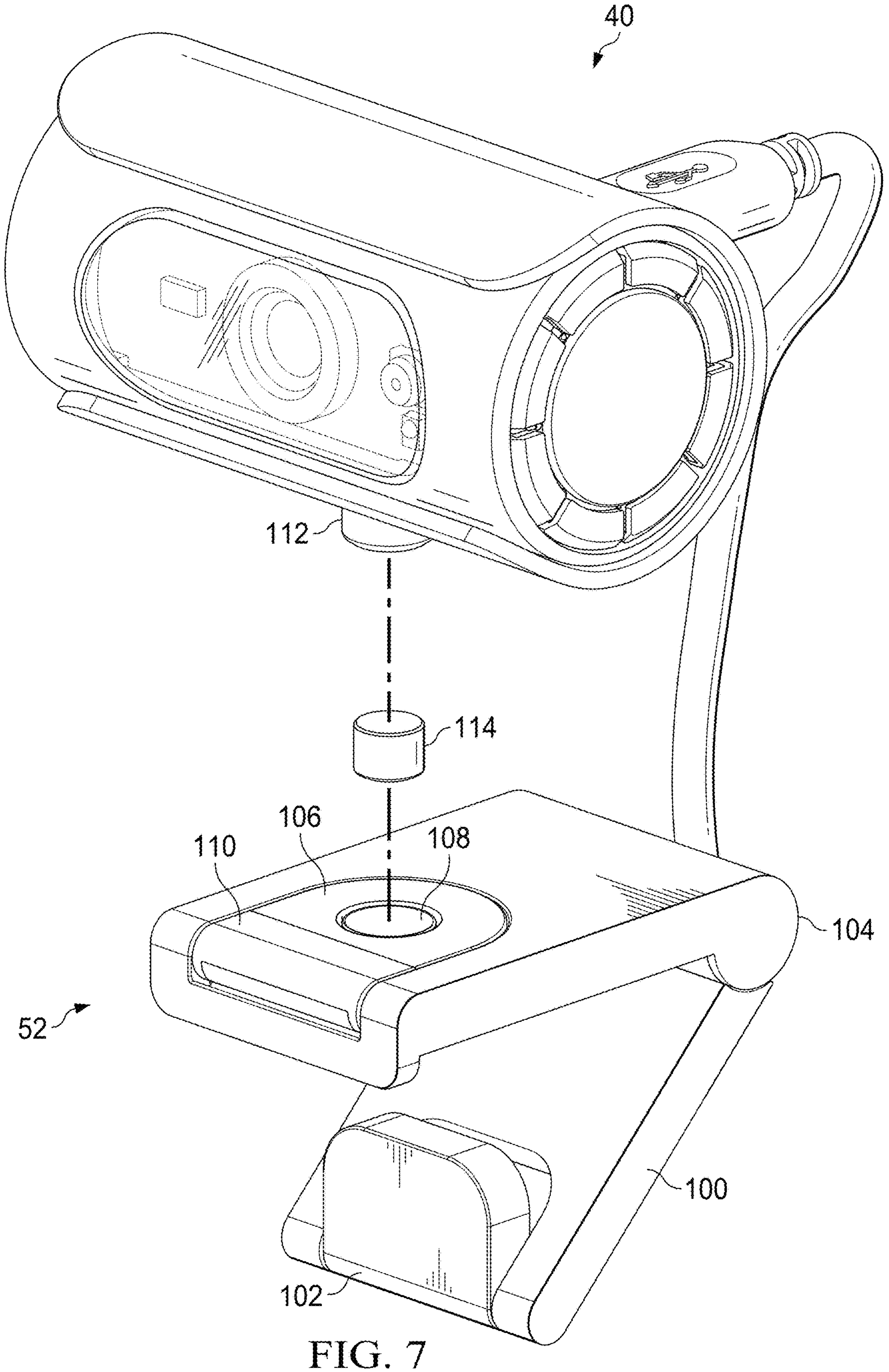
FIG. 7 depicts an upper perspective view of the camera in an operational state mounted to a bracket adapted to hold the camera at a display.

Referring now to FIG. 7, an upper perspective view depicts the camera 40 in an operational state mounted to a bracket 52 adapted to hold the camera at a display. Bracket 52 hinges a lower arm 100 to an upper arm 104 to clip onto a display perimeter at a lip formed in the upper arm. An angle member 102 of lower arm 100 adjusts the angle that the bracket meets the display rear side. A mounting plate 106 fits into an opening of upper arm 104 and has a magnetic ball joint 108 of magnetic material and having a concave form. A ferromagnetic joint 114, such as steel, has a curved end that fits into the concave form of magnetic ball joint 108 so that magnetic attraction holds the camera to the bracket at a bracket mount 112 of the camera. Mounting plate 106 rotationally couples to upper arm 104 with a mounting pin 110.

Figure 8:
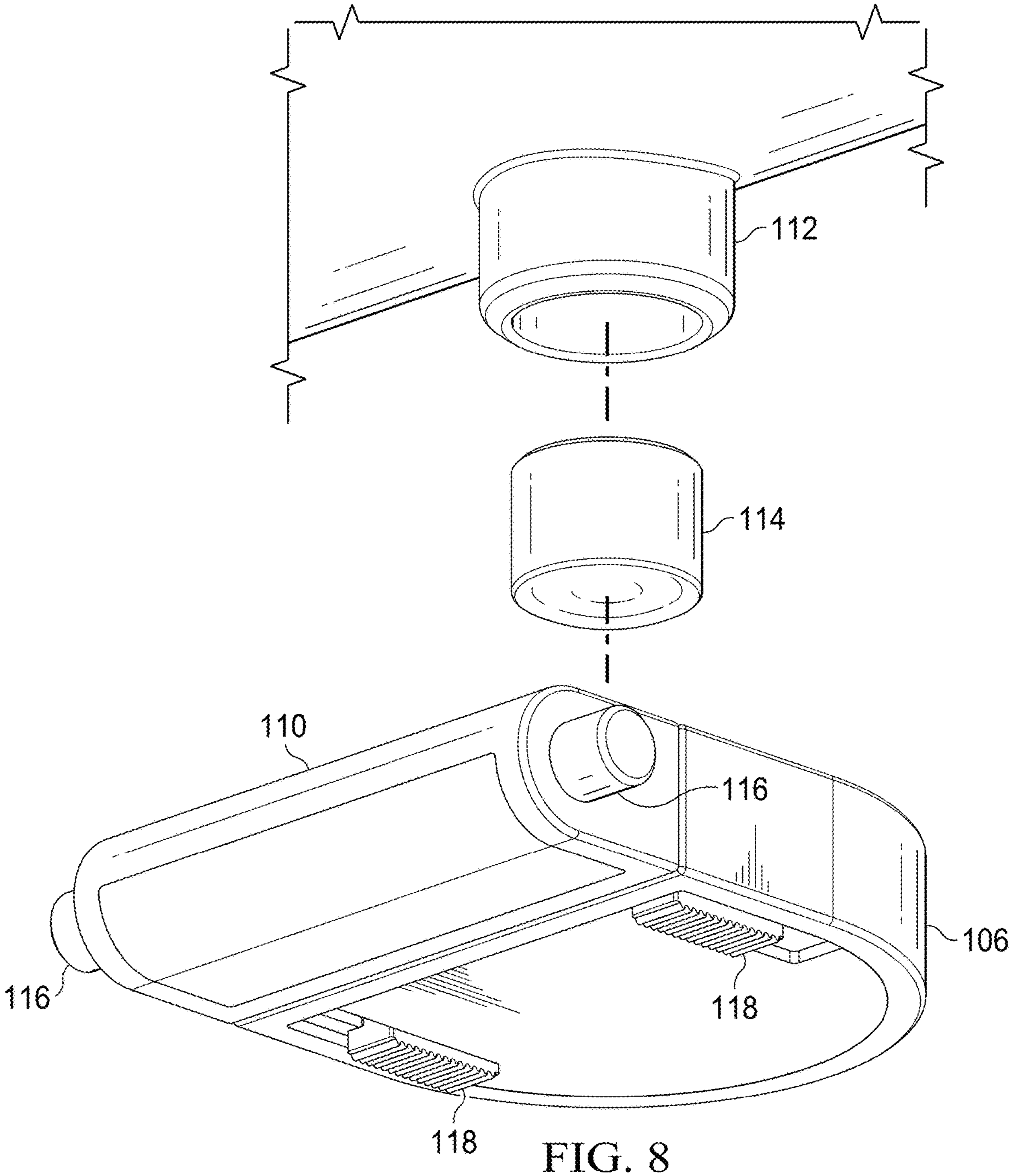
FIG. 8 depicts a side view of the camera bracket mounting plate accepting a ferromagnetic joint at a magnetic ball joint.

Referring now to FIG. 8, a side view depicts the camera bracket mounting plate 106 accepting a ferromagnetic joint 114 at a magnetic ball joint 108. Ferromagnetic joint 114 fits into bracket mount 112, such as with adhesive, to hold the camera to the bracket. Mounting pin 110 terminates at opposing ends 116 that fit into openings of upper arm 104. Sliding members 118 accessible at the bottom surface of mounting plate 106 slide towards and away from mounting pin 110 to selectively engage and release each side of mounting pin 110 at mounting plate 106.

Figure 9:
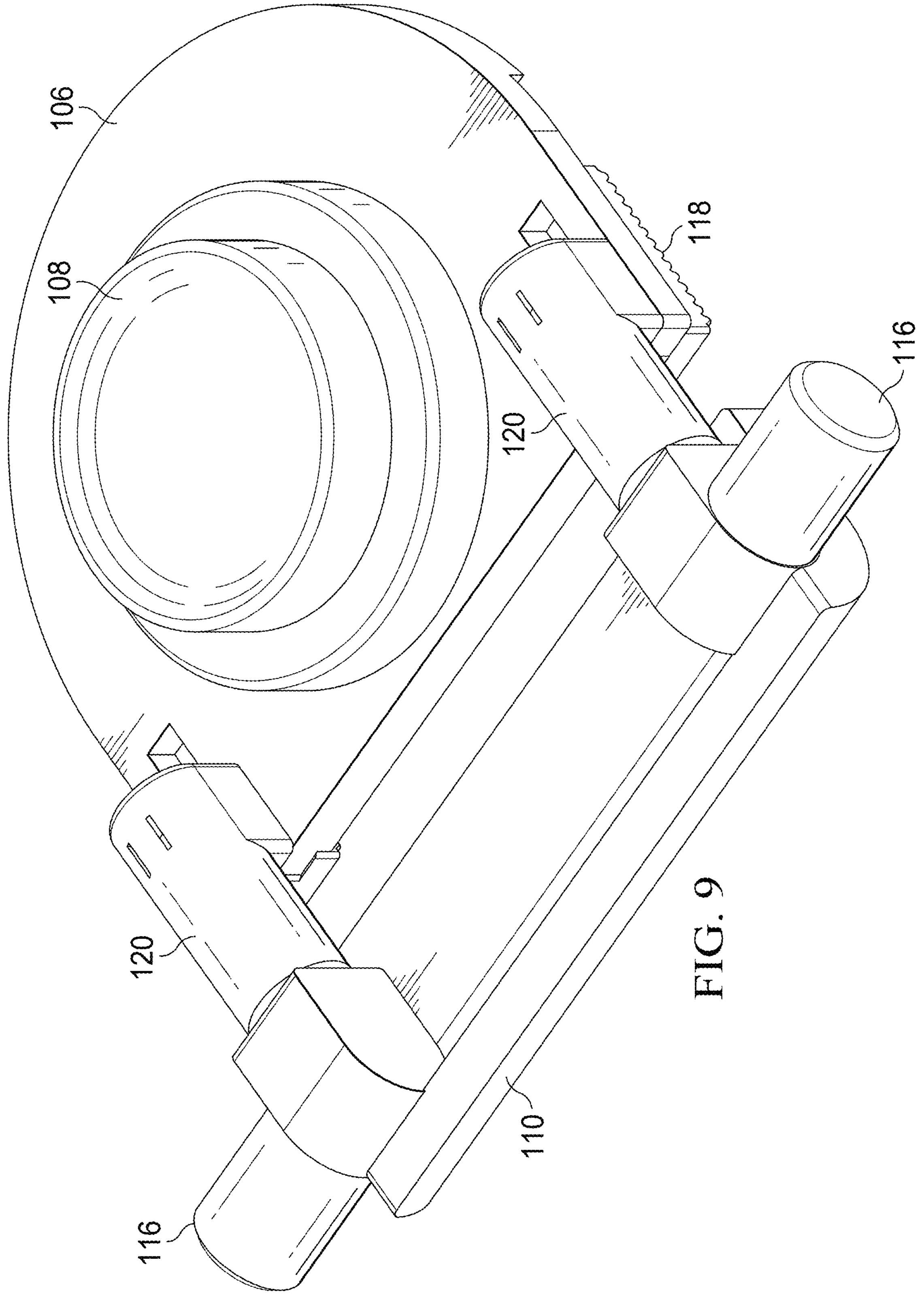
FIG. 9 depicts a bottom view of the mounting plate having engagement of the sliding members in the mounting pin.

Referring now to FIG. 9, a bottom view of the mounting plate depicts engagement of sliding members 118 in mounting pin 110. When sliding members 118 are slid towards mounting pin 110, the mounting pin ends are maintained in position and the mounting plate can rotate about both ends 116 of the mounting pin relative to the upper arm. When a sliding member 118 slides away from mounting pin 110, a pin 120 is retracted from an opening of the mounting pin so that the mounting pin is free to rotate relative to the mounting plate.

Figure 10:
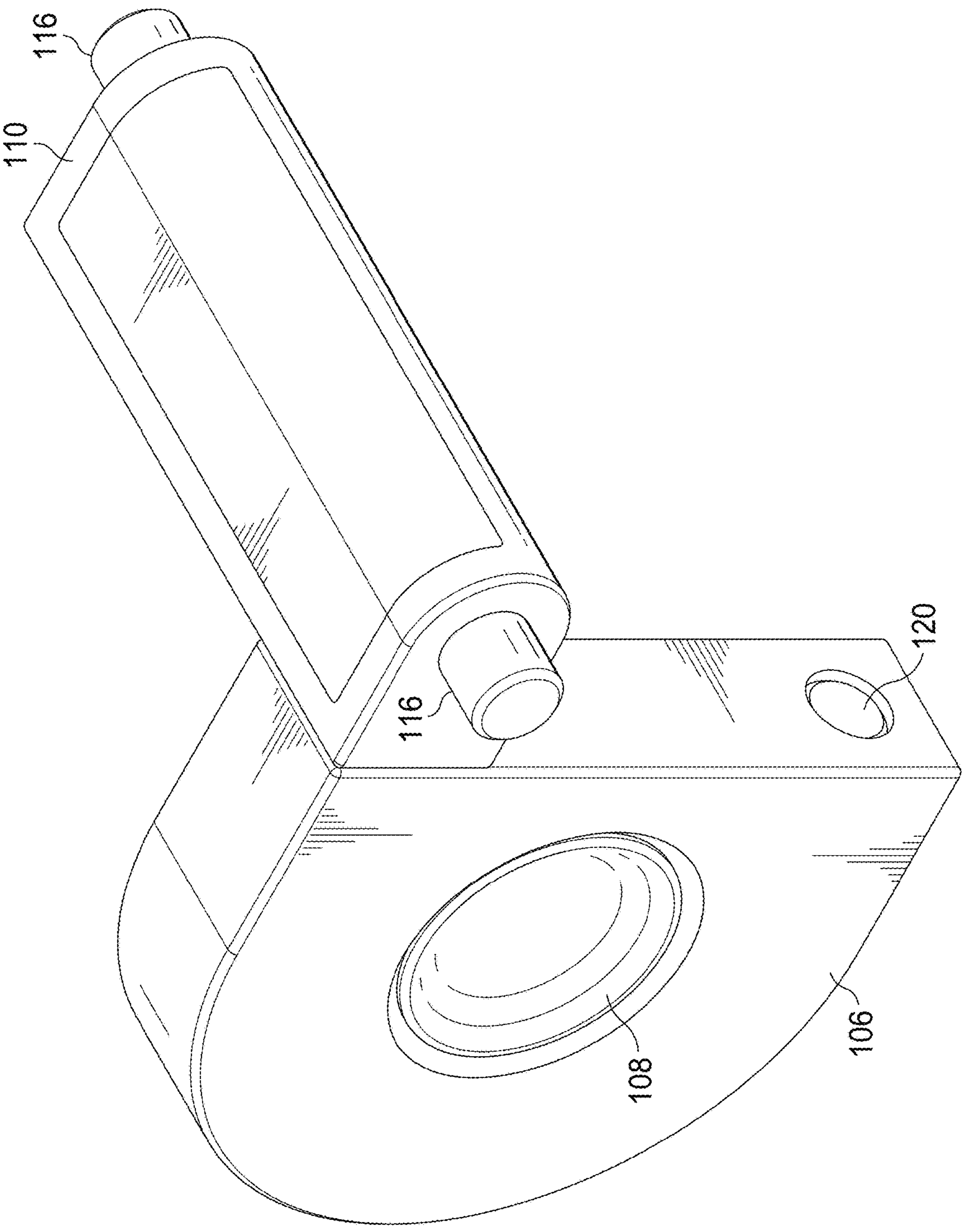
FIG. 10 depicts a side view of rotation of the mounting plate relative to mounting pin when a pin is retracted with a sliding member.

Referring now to FIG. 10, a side view depicts rotation of mounting plate 106 relative to mounting pin 110 when a pin 120 is retracted with a sliding member 118. The rotation of mounting plate 106 relative to mounting pin 110 provides an additional axis for the camera to align relative to the arms that couple the bracket to the display as is demonstrated in the example embodiment below.

Figure 11:
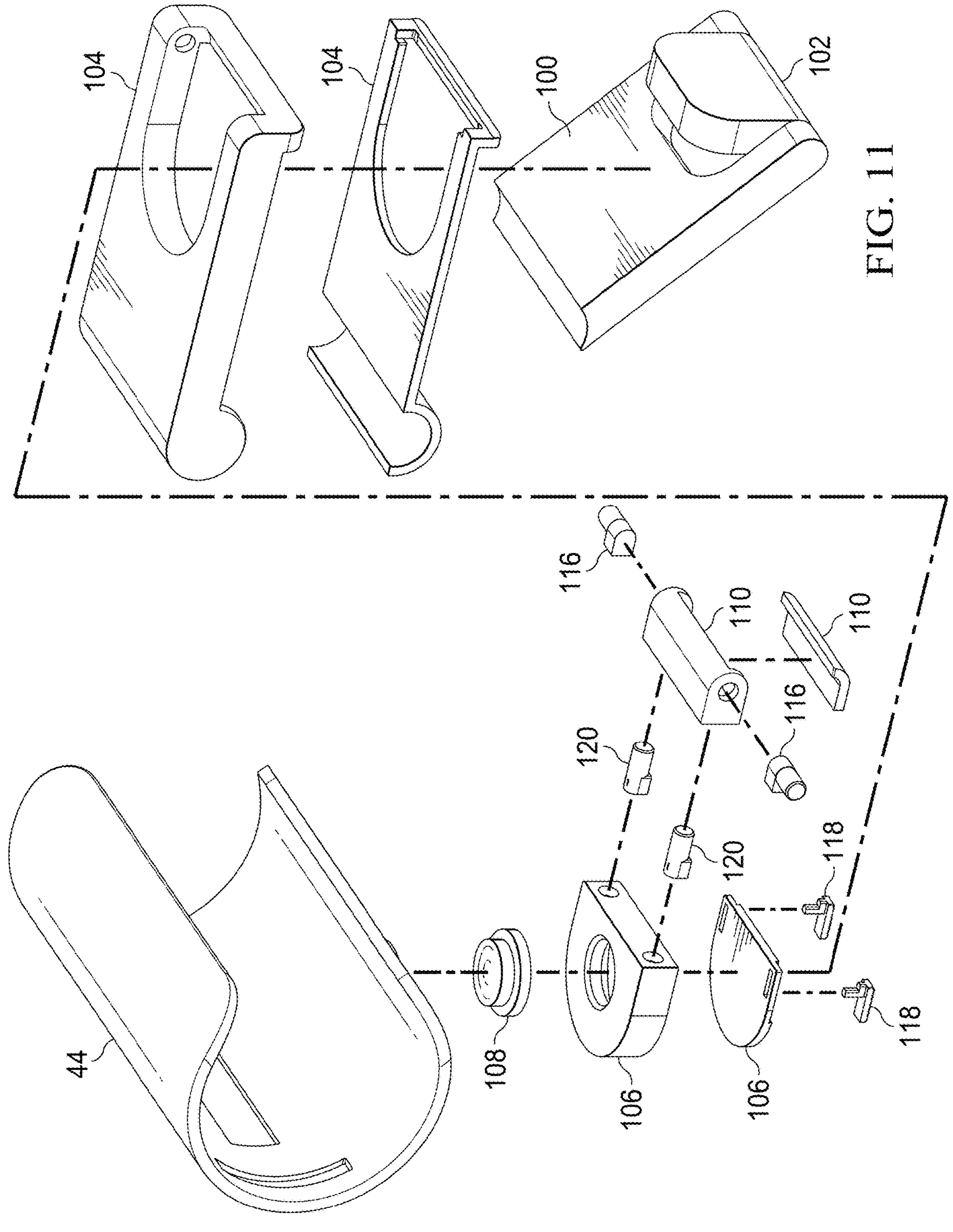
FIG. 11 depicts a side perspective exploded view of the camera mounting bracket.

Referring now to FIG. 11, a side perspective exploded view depicts the camera mounting bracket. Lower arm 100 has an angle member 102 that adjusts with the angle at which the bracket couples to a display. Upper arm 104 rotationally couples to lower arm 100 with upper and lower assembled portions that capture mounting plate 106. A lip at the front side of upper arm 104 overlaps the display front side to hold the bracket in place. Mounting plate 106 assembles a magnetic ball joint that magnetically couples to a ferromagnetic joint coupled in the support member of the camera. Pins 120 fit into openings of mounting plate 106 and couple to sliding members 118 at the bottom of mounting plate 106 to allow extension and retraction of the pins by actuation of the sliding members. Pins 120 selectively insert into and retract from mounting pin 110 to release each side of mounting pin 110 to rotate relative to mounting plate 106. Mounting pin 110 assembles to capture ends 116 that fit into openings of upper arm 104 and rotate mounting plate 106 relative to upper arm 104.

Figure 12A:
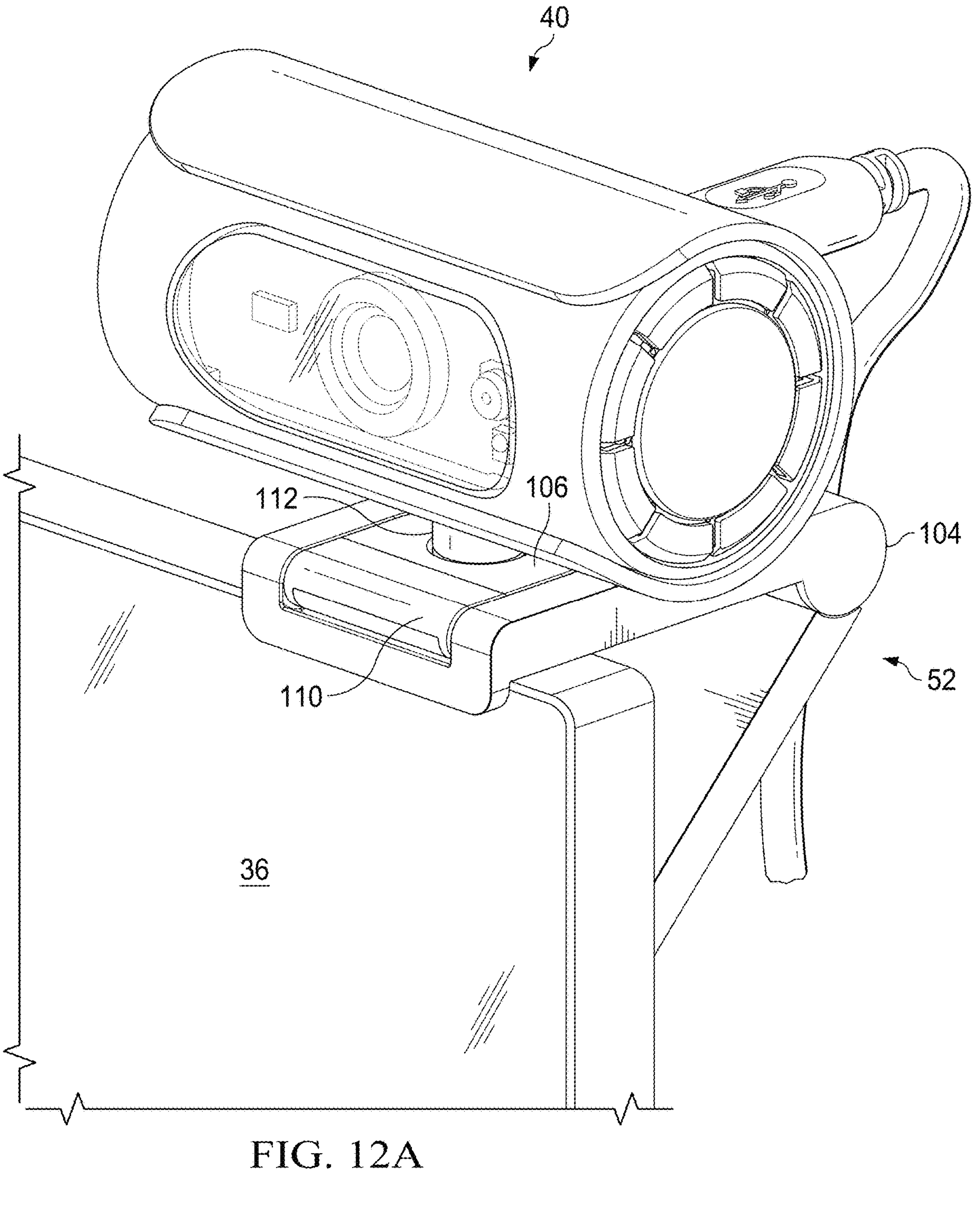
FIGS. 12A, 12B, 12C, and 12D depict an example embodiment of the camera bracket that adjusts between top and side coupling positions at a display.
Figure 12B:
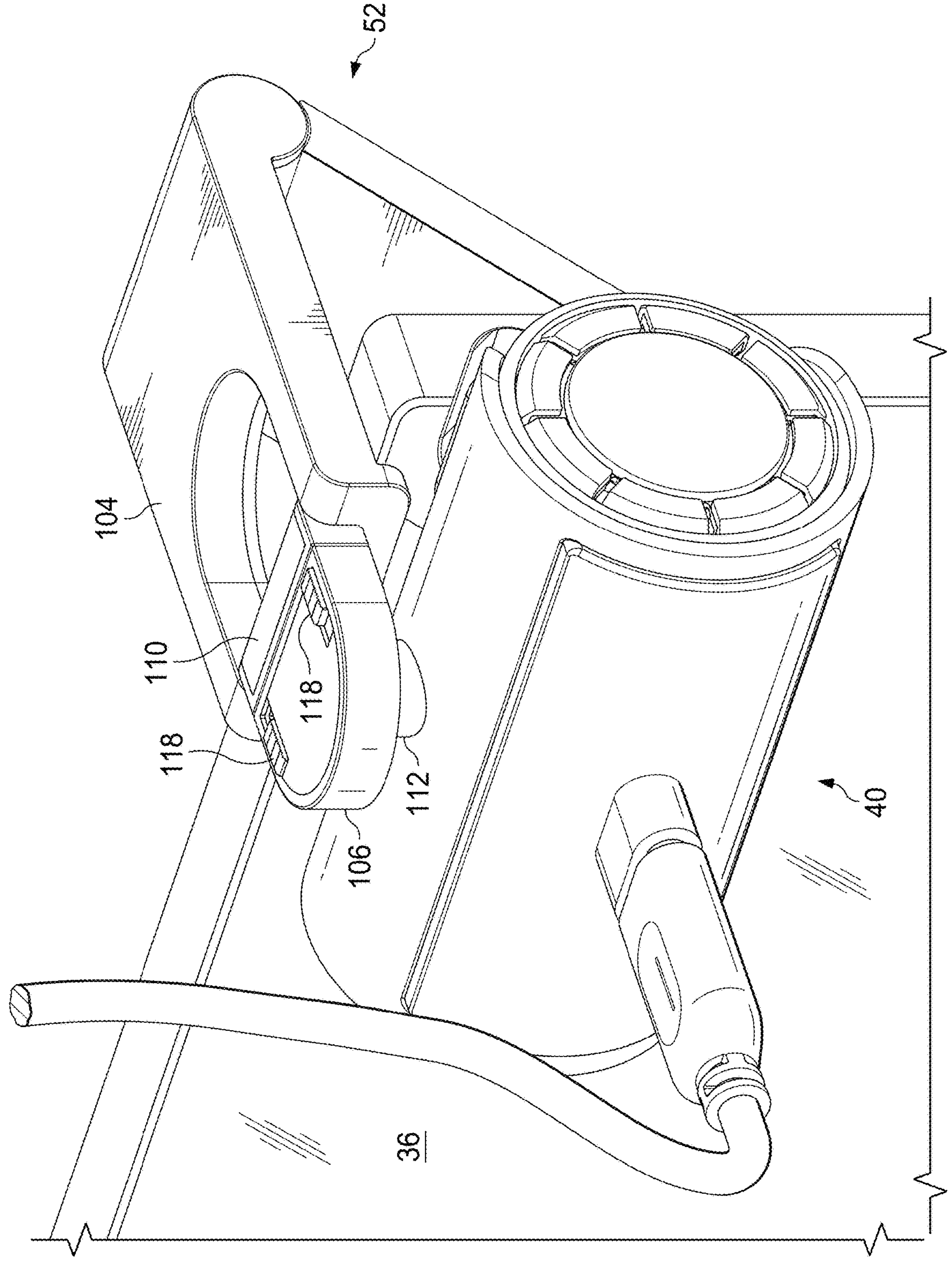
Figure 12C:
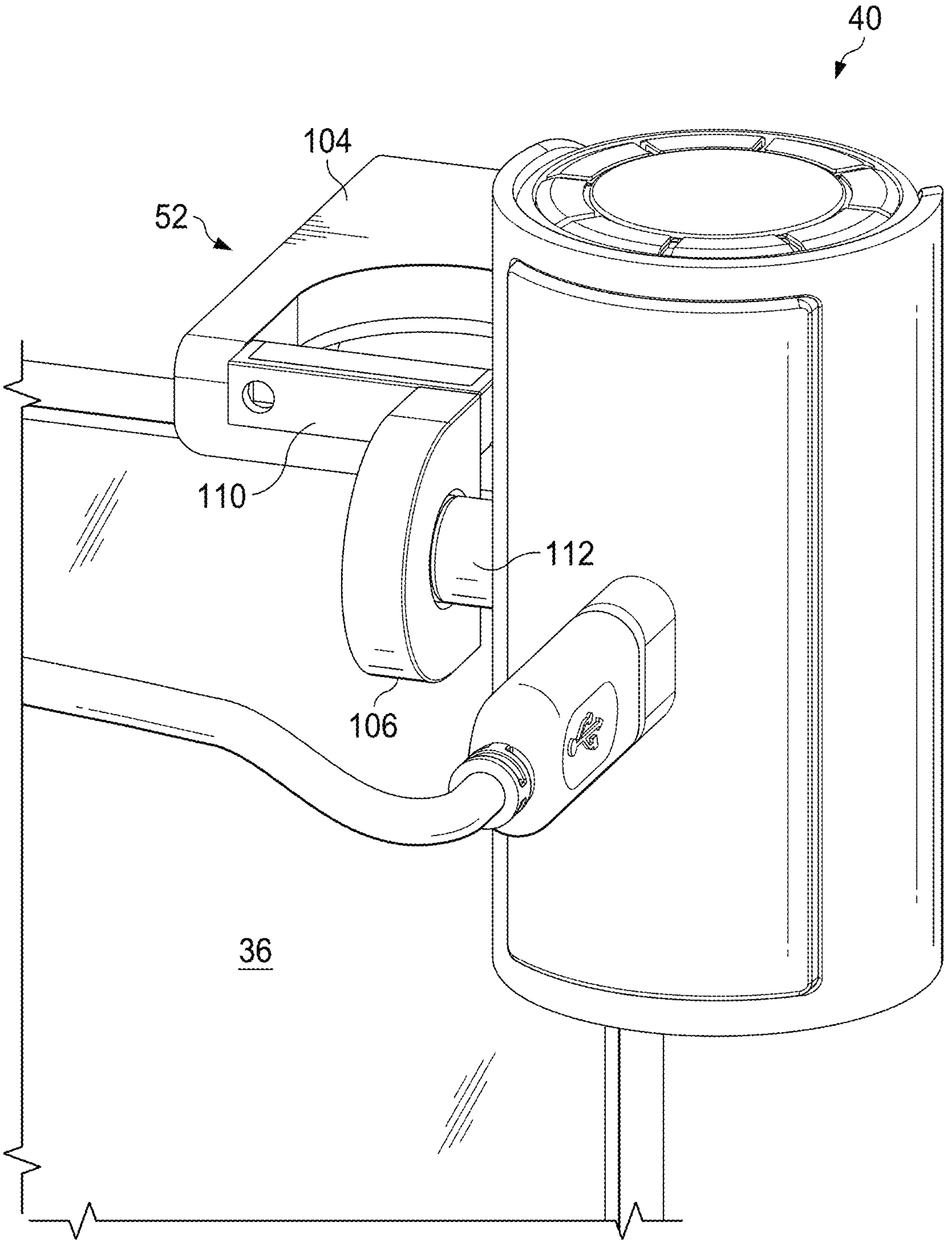
Figure 12D:
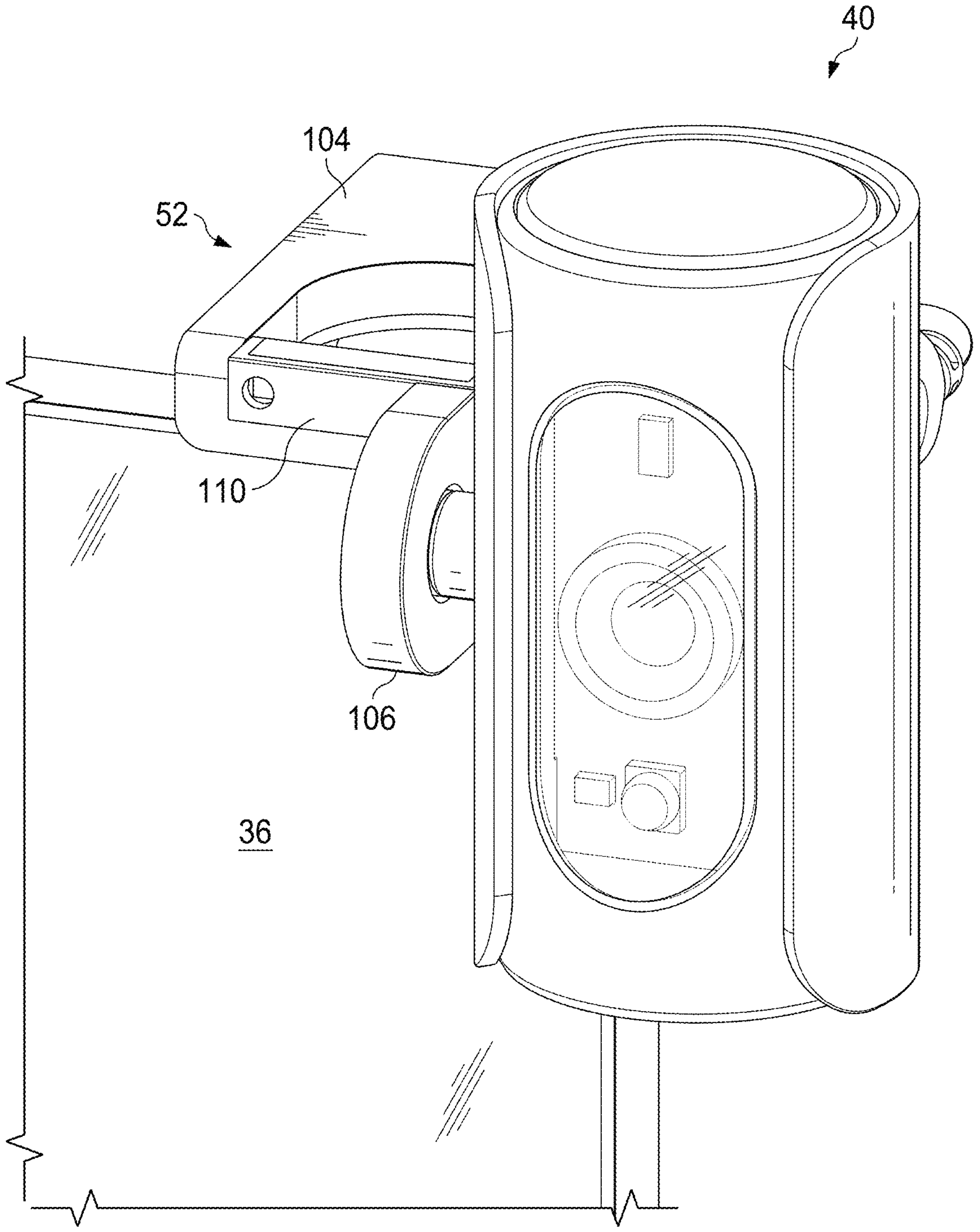

Referring now to FIGS. 12A, 12B, 12C, and 12D, an example embodiment of the camera bracket 52 adjusts between top and side coupling positions at a display 36. FIG. 12A depicts camera 40 coupled to bracket 52 and held to a top position of display 36 with a lip of the bracket upper arm overlapped at the display perimeter and the lower arm biased against the display rear side. FIG. 12B depicts the bracket mounting plate 106 flipped 180 degrees about mounting pin 110 relative to upper arm 104, resulting in camera 40 having the front face against display 36. Sliding member 118 is slid forward to release the mounting plate pin from mounting pin 110 so that mounting plate 106 is free to rotate relative to upper arm 104. FIG. 12C depicts rotation of camera 40 by 90 degrees achieved with release of one of the pins holding mounting plate 106 in mounting pin 110 so that mounting plate 106 rotates by 90 degrees about the other pin. FIG. 12D depicts rotation of camera 40 to view forward at display 36 by rotating 180 degrees at the magnetic ball joint of mounting plate 106 with free rotation by the ferromagnetic joint. In addition, the ferromagnetic joint rotates within the concave form of the magnetic ball joint to tilt the camera field of view inwards towards a center viewing position of the display. The multi axis bracket rotations adapt to positions on either side, top and bottom of the display perimeter for capturing visual images in a variety of orientations.

Figure 13:
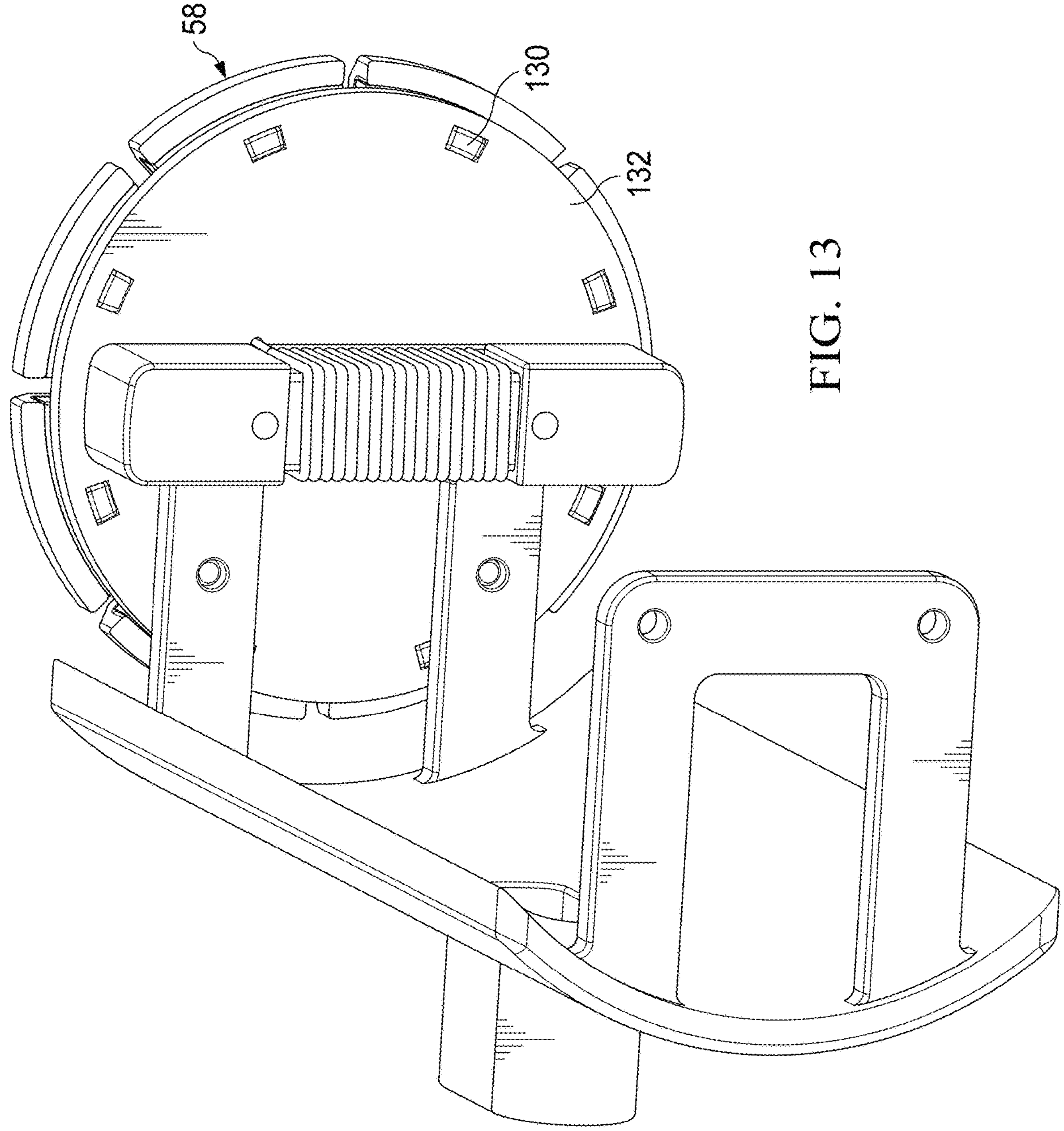
FIGS. 13, 13A, 13B and 13C depict an example embodiment of an input dial that couples to the camera to accept inputs that manage camera operations.
Figure 13A:
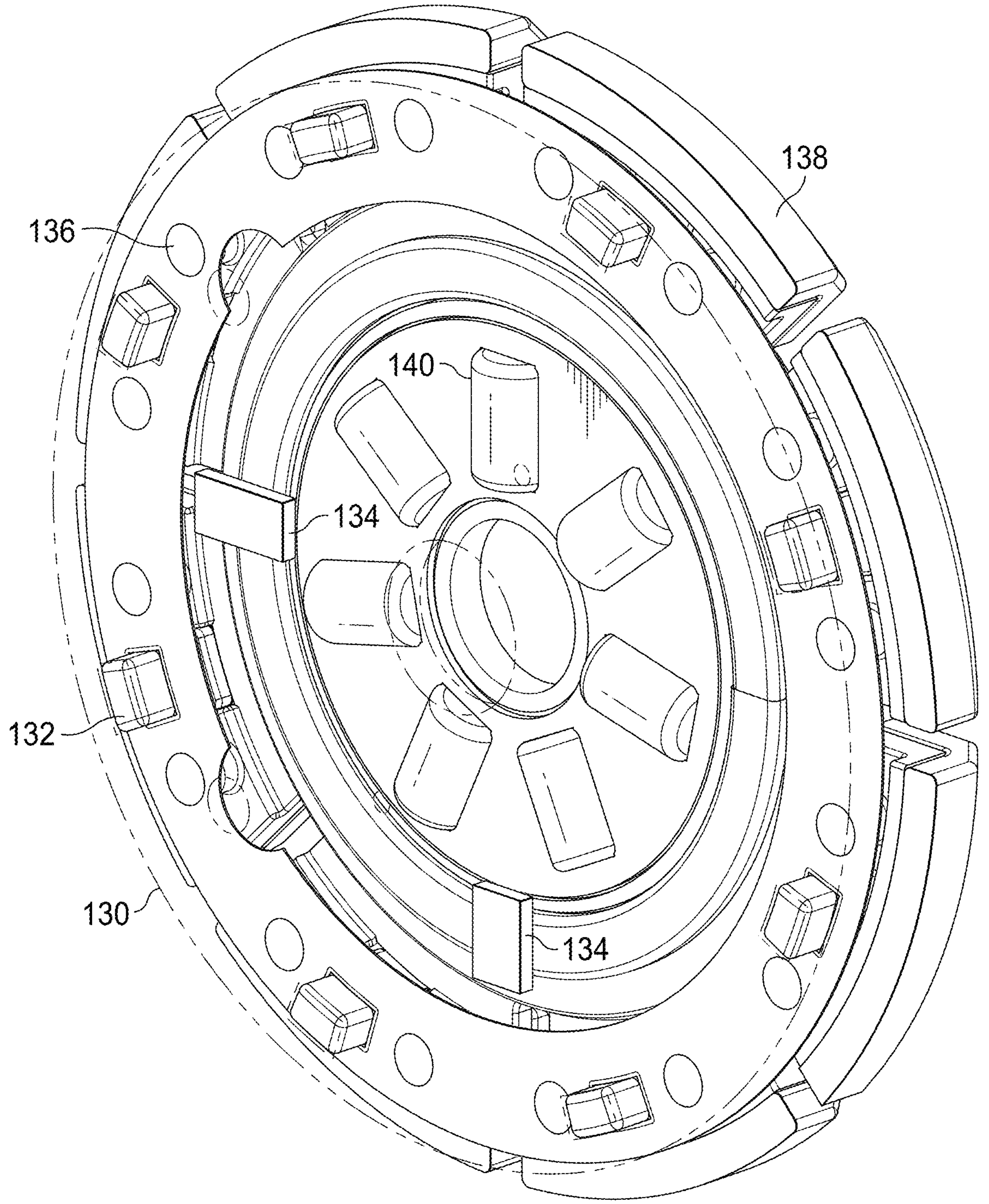
Figure 13B:
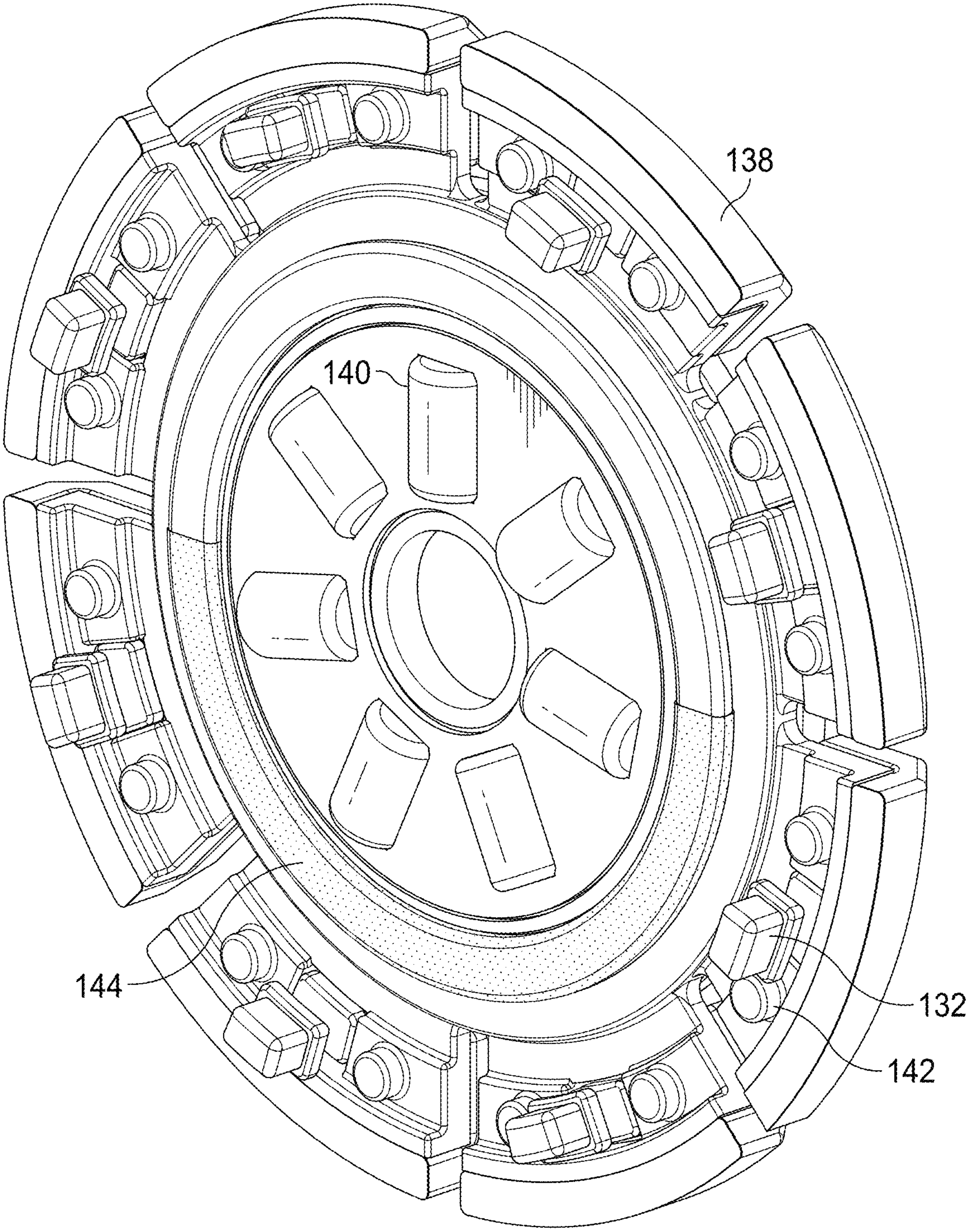

Referring now to FIGS. 13, 13A, 13B and 13C, an example embodiment is depicted of an input dial 58 that couples to the camera to accept inputs that manage camera operations. FIG. 13 depicts input dial 58 coupled to the camera rear support arms as described above. The electromagnet is supported on the rear support arms at one side and the input dial printed circuit board 130 is supported on the rear support arms opposite the electromagnet. In one embodiment, screws passing through input dial printed circuit board 130 and the rear support arms engage threads formed in the electromagnet to couple the assembly in place. Ferromagnetic material stubs 132, such as steel, couple in input dial printed circuit board 130 at each location of an input button 138, as shown by FIG. 13. Printed carbon contact points 136 formed in input dial printed circuit board 130 detect when a button 138 is depressed as an input. Needle thrust ball bearings 140, shown as a transparent view in FIG. 13A and as integrated in the input dial in FIG. 13B, provide a low rotary force rotation of the input dial relative to the input dial printed circuit board 130 by rotating over the printed circuit board when the input dial is spun. In the example embodiment, Hall sensors 134 coupled to the input dial printed circuit board detect rotation of the dial based upon shifts in the magnetic field generated by magnets coupled to the input dial.

Figure 13C:
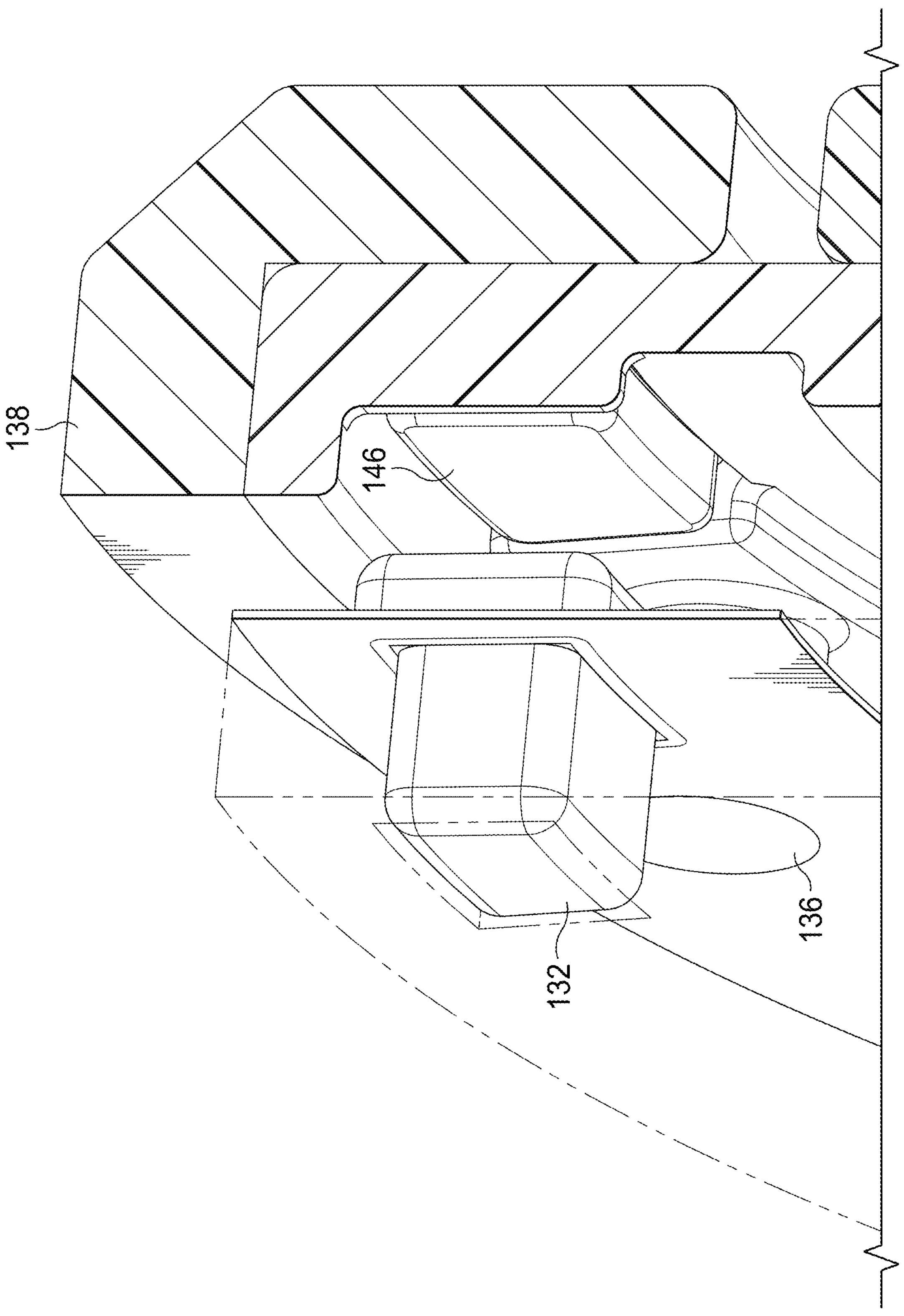

FIG. 13B depicts an inner view of input dial 58 with ferromagnetic material stubs 132 depict in a location where the input dial printed circuit board is ready to accept an input. Needle thrust ball bearings 140 provide a low resistance rotation of input dial 58 which aligns with a neutral position having ferromagnetic stubs 132 aligned with magnets 146 coupled in the input dial as shown in FIG. 13C. A Hall sensor magnet 144 couples in input dial 58 aligned with the Hall sensors 134 to detect rotation of input dial 58. In the example embodiment, input dial 58 is formed with a double shot injection mold to have a first outer layer of a central support section surrounded by eight input buttons 138 in a flower petal arrangement and a second inner layer formed of a silicon rubber. The outer surface of input dial 58 is hard plastic and the inner surface is a soft silicon rubber that couples the input buttons to the central section and yields to input presses with a soft click interface with a resilience that returns the input buttons to a raised position after an input press. As shown by FIG. 13C, ferromagnetic stub 132 interacts with a magnet 146 when an input press is made to generate a tactile feel as feedback to an end user. The carbon print contact 136 detects the input and reports the input to the input dial printed circuit board. The soft click input and end user tactile feedback enhances the end user experience by accepting inputs directly at the camera with a soft touch or rotation that does not disrupt the camera position in a bracket. Although the example embodiment is described as accepting input dial rotation and button presses to command cylinder rotation, other types of inputs may be commanded, such as power on and off the camera, mute for a camera microphone and a pause of camera video.

Figure 14:
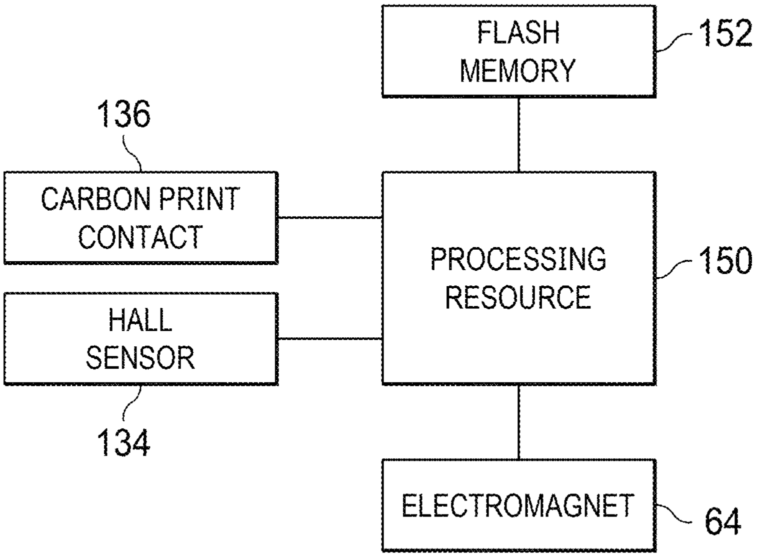
FIG. 14 depicts a block diagram of logical elements that manage camera operational and nonoperation positions based upon inputs at an input dial.

Referring now to FIG. 14, a block diagram depicts logical elements that manage camera operational and nonoperation positions based upon inputs at an input dial. A processing resource 150, such as microcontroller unit (MCU), executes instructions stored in flash memory 152 or other non-transitory memory to manage camera operations based upon inputs made to the input dial. The processing resource and flash memory may be coupled to the input dial printed circuit board or the communication circuit board in the camera rear support. When a carbon print contact 136 detects an end user button press, processing resource 150 commands current to electromagnet 64 to initiate movement of the camera rotation, and then reverses the current to complete the rotation. The reversal of the current may be performed based upon time or position sensor that detects rotation of the camera cylinder. Similarly, when Hall sensor 134 detects rotation of the input dial, processing resource 150 commands current to electromagnet 64 to rotate the cylinder. In one embodiment, the cylinder is commanded to rotate in the direction of the input dial rotation. In various embodiments, dial rotations and input button presses may perform other functions for camera control, such as power on/off, pause, mute, etc. In one example embodiment, the processing resource detects a command to change to a nonoperational state at the camera when a hand blocks the camera lens for a predetermined time period.

Although the present invention has been described in detail, it should be understood that various changes, substitutions and alterations can be made hereto without departing from the spirit and scope of the invention as defined by the appended claims.

What is claimed is:

1. An information handling system comprising:
- a housing;
- a processor coupled in the housing and operable to execute instructions to process information;
- a memory coupled in the housing and interfaced with the processor, the memory operable to store the instructions and information;
- a display interfaced with the processor and operable to present the information as visual images;
- a camera having a camera module coupled in a housing and operable to capture visual images; and
- a camera bracket having an upper arm with a lip overlapping the display, a lower arm rotationally coupled to the upper arm and biased against a rear side of the display, a mounting plate rotationally coupled to the upper arm by a mounting pin and coupled to the camera, the mounting plate rotating about the mounting pin at a first axis from a first position having the camera directed towards a viewing position of the display to a second position directed at the display.

2. The information handling system of claim 1 further comprising:
- a pin inserting from the mounting plate into the mounting pin; and
- a sliding member exposed at the mounting plate and coupled to the pin, the sliding member selectively sliding to release the pin from the mounting pin, the mounting plate then rotating about a second axis orthogonal the first axis to rotate the camera from a horizontal alignment at the display to a vertical alignment.

3. The information handling system of claim 2 further comprising:
- a magnetic ball joint coupled in the mounting plate having a curved mounting surface; and
- a ferromagnetic joint coupled to the camera and having a curved mounting surface that conforms to the magnetic ball joint.

4. The information handling system of claim 3 wherein the camera rotates about the magnetic ball joint in a plane parallel to the mounting plate to adjust the camera field of view to the viewing position of the display.

5. The information handling system of claim 4 wherein the camera tilts at the magnetic ball joint to adjust the field of view of the camera off of the plane parallel to the mounting plate.

6. The information handling system of claim 2 further comprising:
- first and second pins extending from the mounting plate at opposing ends of the mounting pin;
- a first sliding member interfaced with the first pin and selectively retracting the first pin from the mounting pin to rotate the mounting plate at a first end of the mounting pin; and
- a second sliding member interfaced with the second pin and selectively retracting the second pin from the mounting pin to rotate the mounting plate at a second end of the mounting pin.

7. The information handling system of claim 1 further comprising:
- a camera module;
- a cylinder, the cylinder coupling the camera module in an interior of the cylinder and aligned with an opening of the cylinder; and
- an outer frame having a open face, the cylinder rotating in the outer frame to selectively expose and block the camera module.

8. The information handling system of claim 7 further comprising an input dial exposed at one end of the cylinder and accepting commands to rotate the cylinder in the outer frame to expose and block the camera module.

9. The information handling system of claim 7 further comprising an actuator coupled in the cylinder and operable to rotate the cylinder in the outer frame.

10. A method for operating a camera bracket, the method comprising:

coupling the camera bracket to a display by overlapping a lip of an upper arm of the display bracket at the display perimeter and compressing the lip by biasing a lower arm of the bracket against the display rear side;

rotationally coupling a mounting plate in an opening of the upper arm with a mounting pin;

coupling the camera to the mounting plate with a field of view of the camera directed at a viewing position of the display; and rotating the mounting plate about the mounting pin to direct the field of view at the display.

11. The method of claim 10 further comprising:

sliding a first pin from a first end of the mounting pin into the mounting plate; and rotating the mounting plate around a second pin at a second end of the mounting pin to rotate the camera from a horizontal orientation to a vertical orientation.

12. The method of claim 11 further comprising:

sliding the second pin from the second end of the mounting pin into the mounting plate; and rotating the mounting plate around the first pin at the first end of the mounting pin to rotate the camera from a horizontal orientation to a vertical orientation.

13. The method of claim 11 further comprising:

rotating the camera about an axis orthogonal the mounting plate to direct the camera towards the viewing position of the display.

14. The method of claim 13 further comprising:

coupling a magnetic ball joint in the mounting plate;

coupling a steel joint in the camera; and mounting the camera to the mounting plate by magnetic attraction.

15. The method of claim 14 further comprising tilting the camera at the steel joint interface with the magnetic ball joint.

16. A camera bracket comprising:

an upper arm having a lip configured to overlap a display;

a lower arm rotationally coupled to the upper arm and biased to press against a rear side of the display;

a mounting plate rotationally coupled to the upper arm by a mounting pin and configured to couple to a camera, the mounting plate rotating about the mounting pin at a first axis from a first position having the camera directed towards a viewing position of the display to a second position directed at the display.

17. The camera bracket of claim 16 further comprising:

a first pin inserting from the mounting plate into the mounting pin; and a first sliding member exposed at the mounting plate and coupled to the pin, the first sliding member selectively sliding to release the pin from the mounting pin, the mounting plate then rotating about a second axis orthogonal the first axis to rotate the camera from a horizontal alignment at the display to a vertical alignment.

18. The camera of claim 17 further comprising:

a second pin inserting from the mounting plate into the mounting pin, the first pin at a first end of the mounting pin, the second pin at a second end of the mounting pin; and a second sliding member exposed at the mounting plate and coupled to the second pin, the second sliding member selectively sliding to release the second pin from the mounting pin, the mounting plate then rotating about a second axis orthogonal the first axis to rotate the camera from a horizontal alignment at the display to a vertical alignment.

19. The camera of claim 17 further comprising:

a magnetic ball joint coupled in the mounting plate having a curved mounting surface; and a ferromagnetic joint configured to couple to the camera and having a curved mounting surface that conforms to the magnetic ball joint;

wherein the camera rotates about the magnetic ball joint in a plane parallel to the mounting plate to adjust the camera field of view to the viewing position of the display.

20. The camera of claim 19 wherein the camera tilts at the magnetic ball joint to adjust the field of view of the camera off of the plane parallel to the mounting plate.

* * * * *